United States Patent
Lasker et al.

(10) Patent No.: US 10,943,290 B2
(45) Date of Patent: Mar. 9, 2021

(54) INTERFACE FOR PROVIDING A SHOPPING KEYBOARD ON MOBILE DEVICE

(71) Applicant: Viber Media S.à r.l., Luxembourg (LU)

(72) Inventors: Zephrin Lasker, Mill Valley, CA (US); Michael Davis, San Francisco, CA (US); Mat Lyles, Emeryville, CA (US); Djamel Agaoua, Mill Valley, CA (US)

(73) Assignee: Viber Media S.à r.l., Luxembourg (LU)

( * ) Notice: Subject to any disclaimer, the term of this patent is extended or adjusted under 35 U.S.C. 154(b) by 90 days.

(21) Appl. No.: 16/090,487

(22) PCT Filed: Mar. 29, 2017

(86) PCT No.: PCT/US2017/024831
§ 371 (c)(1),
(2) Date: Oct. 1, 2018

(87) PCT Pub. No.: WO2017/172973
PCT Pub. Date: Oct. 5, 2017

(65) Prior Publication Data
US 2019/0114697 A1    Apr. 18, 2019

Related U.S. Application Data

(60) Provisional application No. 62/316,816, filed on Apr. 1, 2016.

(51) Int. Cl.
*G06Q 30/06* (2012.01)
*G06Q 20/32* (2012.01)
(Continued)

(52) U.S. Cl.
CPC ..... *G06Q 30/0641* (2013.01); *G06F 3/04886* (2013.01); *G06Q 20/322* (2013.01);
(Continued)

(58) Field of Classification Search
CPC ........................................ G06Q 30/0601–0643
See application file for complete search history.

(56) References Cited

U.S. PATENT DOCUMENTS

| 10,505,875 B1 * | 12/2019 | Jenks | ...................... H04L 51/28 |
| 2005/0267870 A1 * | 12/2005 | Everett-Church | ...... H04L 67/10 |

(Continued)

FOREIGN PATENT DOCUMENTS

| WO | 2007143814 | 12/2007 |

OTHER PUBLICATIONS

Everything You Need to Know About iOS 8 Keyboard Permissions (But Were Afraid to Ask) Natasha Lomas@riptari / 10:56 am EDT•Oct. 4, 2014 (Year: 2014).*

(Continued)

*Primary Examiner* — William J Allen
(74) *Attorney, Agent, or Firm* — Akerman LLP; Mammen (Roy) P. Zachariah, Jr.

(57) ABSTRACT

A method that includes replacing a standard keyboard displayed on a display of a first mobile device with a second shopping keyboard. The second shopping keyboard includes third keys that represent purchasable items (a product and/or service). After one of the third keys, which represents a particular item, is selected, a sharing option and/or purchasing option is/are displayed. When selected, the sharing option supplies information about the particular item to a messaging application that communicates the information to a second mobile device. When selected, the purchasing option initiates purchase of the particular item. The method may also include displaying a first shopping keyboard comprising second keys representing businesses. After one of the second keys, representing a particular business, is selected, the second shopping keyboard is displayed. The purchasable items represented by the third keys are available from the particular business.

21 Claims, 16 Drawing Sheets

(51) Int. Cl.
G06F 3/0488 (2013.01)
H04L 12/58 (2006.01)
(52) U.S. Cl.
CPC ..... *G06Q 30/0603* (2013.01); *G06Q 30/0623* (2013.01); *H04L 51/046* (2013.01)

(56) References Cited

U.S. PATENT DOCUMENTS

| | | | |
|---|---|---|---|
| 2010/0094729 A1* | 4/2010 | Gray | G06Q 30/0601 705/26.1 |
| 2011/0258086 A1 | 10/2011 | Stein | |
| 2014/0089472 A1 | 3/2014 | Tessler | |
| 2014/0279198 A1* | 9/2014 | Berk | G06Q 50/01 705/26.7 |
| 2015/0242897 A1* | 8/2015 | Dinardo, Jr. | H04L 51/38 705/14.56 |
| 2016/0279523 A1* | 9/2016 | Altagar | A63F 13/2145 |
| 2017/0131870 A1* | 5/2017 | Harper | G06F 3/04817 |
| 2018/0373683 A1* | 12/2018 | Hullette | G06F 40/134 |

OTHER PUBLICATIONS

World Intellectual Property Organization, "International Search Report and Written Opinion," issued in International Patent Application No. PCT/US2017/024831, dated Jul. 3, 2017, document of 11 pages.

* cited by examiner

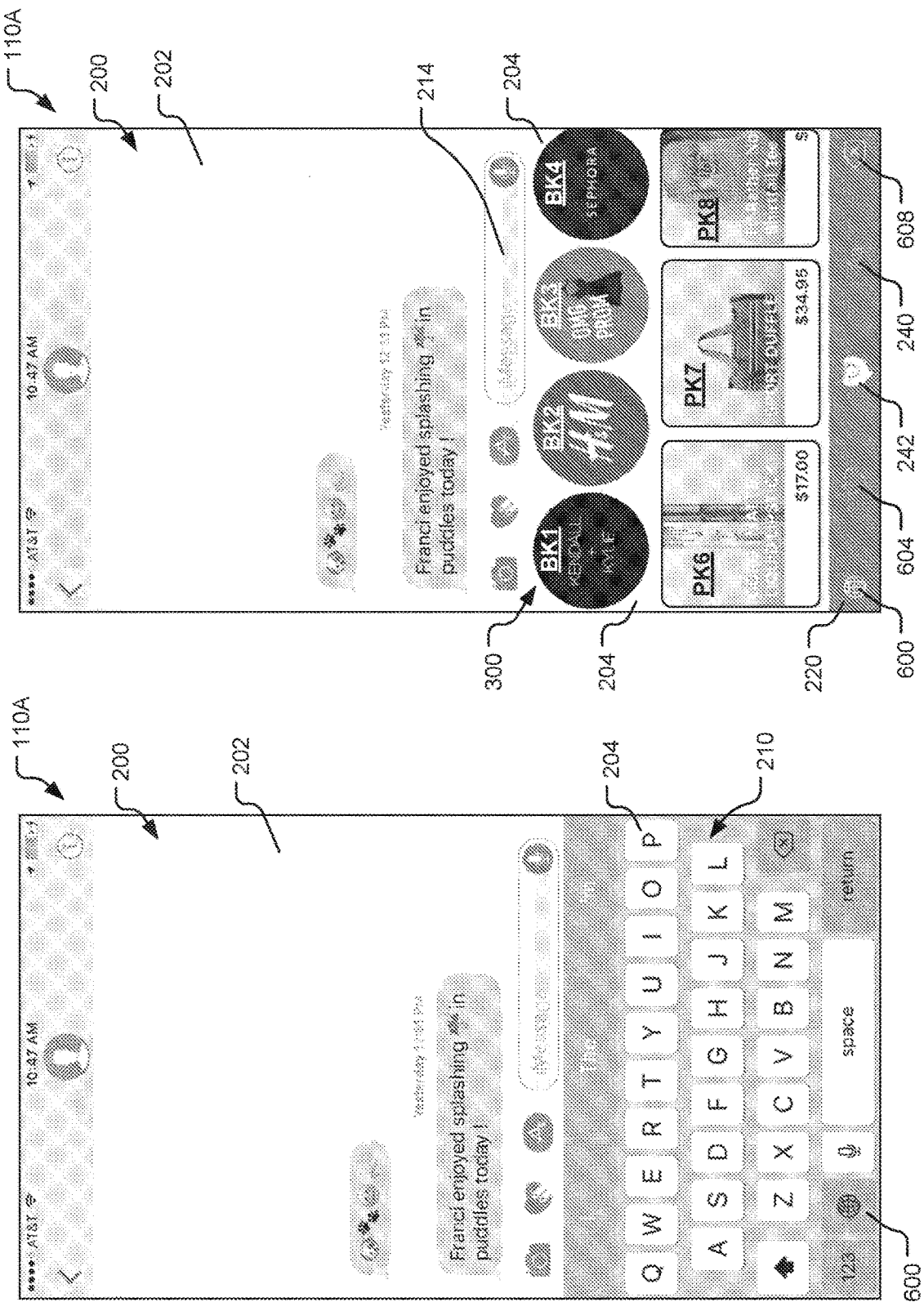

INTERFACE FOR PROVIDING A SHOPPING KEYBOARD ON MOBILE DEVICE

CROSS REFERENCE TO RELATED APPLICATIONS

This application is a § 371 National Phase of PCT/US2017/024831, filed Mar. 29, 2017, the entirety of which is incorporated by reference and which claims priority to U.S. Provisional Patent Application No. 62/316,816, filed Apr. 1, 2016.

This application claims the benefit of U.S. Provisional Application No. 62/316,816, filed on Apr. 1, 2016, which is incorporated herein by reference in its entirety.

BACKGROUND OF THE INVENTION

Field of the Invention

The present invention is directed generally to interfaces for mobile devices and more particularly to interfaces used in messaging applications.

Description of the Related Art

Mobile messaging application usage is the fastest growing category of user behavior on mobile telephones and tablets. Users spend more time on messaging applications than any other type of application. In fact, users use mobile telephones and messaging applications more than any other type of computing device or application. Therefore, a need exists for new and improved interfaces for messaging applications. In particular, interfaces that facilitate efficient browsing, sharing, and selling of products and/or services to users would be particularly desirable. The present application provides these and other advantages as will be apparent from the following detailed description and accompanying figures.

SUMMARY OF THE INVENTION

An embodiment includes a first method for use with first and second mobile devices each including a display and executing a messaging application. The first mobile device is operable to display (on the display of the first mobile device) a first keyboard with first keys. Each of the first keys represents a letter of an alphabet.

The first method includes, at a time when the first mobile device is displaying the first keyboard, replacing (by a shopping application executing on the first mobile device) the first keyboard with a second keyboard. The second keyboard includes second keys each representing a different collection of purchasable items. The purchasable items include a product and/or a service. The first method also includes receiving (by the shopping application) a selection of a particular one of the second keys and displaying (by the shopping application) a third keyboard (on the display of the first mobile device) in response to receiving the selection of the particular second key. The particular second key represents a particular collection and the third keyboard includes third keys that each represent a different one of the purchasable items in the particular collection. The first method also includes receiving (by the shopping application) a selection of a particular one of the third keys, and displaying (by the shopping application and on the display of the first mobile device) one or more item options in response to receiving the selection of the particular third key. The particular third key represents a particular one of the purchasable items. The one or more item options include a sharing option and/or a purchasing option. The sharing option is operable to supply information about the purchasable item represented by the particular third key to the messaging application for communication thereby to the second mobile device. The purchasing option is operable to initiate purchase of the purchasable item represented by the particular third key.

Optionally, the first method may include, at a time when the first mobile device is displaying the first keyboard, receiving (by the first mobile device) selections of the first keys representing a message. The messaging application shares the message with the second mobile device.

Optionally, when the one or more item options include the sharing option, the first method also includes receiving (by the shopping application) a selection of the sharing option, supplying (by the shopping application) information about the particular purchasable item to the messaging application in response to receiving the selection of the sharing option, and instructing (by the shopping application) the messaging application to share the information about the particular purchasable item with the second mobile device in response to receiving the selection of the sharing option.

Optionally, when the one or more item options include the purchase option, the first method also includes receiving (by the shopping application) a selection of the purchase option, and instructing (by the shopping application) the first mobile device to display (on the display of the first mobile device) a website whereat the particular purchasable item is available for purchase in response to the selection of the purchase option.

Optionally, the first method may be for use with the first mobile device having an e-commerce application installed thereon. When the one or more item options include the purchase option, the first method also includes receiving (by the shopping application) a selection of the purchase option, and instructing (by the shopping application) the e-commerce application to display (on the display of the first mobile device) a page in response to the selection of the purchase option The particular purchasable item is available for purchase on the page.

Optionally, the shopping application may display (on the display of the first mobile device) a purchase option in response to receiving the selection of the particular third key, and the first method may include receiving (by the shopping application) a selection of the purchase option, and adding (by the shopping application) the particular purchasable item to a shopping cart in response to the selection of the purchase option.

Optionally, the shopping application may be operable to display the first keyboard (on the display of the first mobile device) and the first method may include displaying (by the shopping application) a first keyboard option (on the display of the first mobile device), receiving (by the shopping application) a selection of the first keyboard option at a time when the first mobile device is displaying the second keyboard, and replacing (by the shopping application) the second keyboard with the first keyboard after receiving the selection of the first keyboard option. Optionally, the first method may also include receiving (by the first mobile device) selections of the first keys representing a message after the shopping application has replaced the second keyboard with the first keyboard, and supplying (by the shopping application) the message to the messaging application, which shares the message with the second mobile device. Optionally, the first method may also include displaying (by the shopping application) a second keyboard option on the display of the first mobile device, and receiving (by the shopping application) a selection of the second keyboard option at a time when the first mobile device is displaying the first keyboard. The first keyboard is replaced with the second keyboard after the selection of the second keyboard option is received.

Optionally, the first method may also include obtaining (by the shopping application) keyboard information from a control system or at least one third party computing system, and configuring (by the shopping application) the second and third keyboards based on the keyboard information. The keyboard information may be used to populate a cascading logic tree that is used by the shopping application to configure the second and third keyboards.

Optionally, the shopping application may display (on the display of the first mobile device) information related to the particular purchasable item in response to receiving the selection of the particular third key.

Optionally, the first method may include downloading (by the first mobile device) the shopping application.

Optionally, the first method may include displaying (by the first mobile device) one or more keyboard settings, and receiving (by the first mobile device) modifications to the one or more keyboard settings that enable the shopping application to display the second keyboard.

An embodiment includes a second method for use with first and second mobile devices each including a display and executing a messaging application. The first mobile device is operable to display a standard keyboard with first keys on the display of the first mobile device. Each of the first keys represent a letter of an alphabet. The second method includes replacing (by a shopping application executing on the first mobile device) the standard keyboard on the display of the first mobile device with a shopping keyboard. The shopping keyboard includes third keys that represent purchasable items. Each of the purchasable items includes a product and/or a service. The second method also includes receiving (by the shopping application) a selection of a particular one of the third keys representing a particular purchasable item, and displaying (by the shopping application) a sharing option and/or a purchasing option (on the display of the first mobile device) in response to the selection of the particular third key. The sharing option is operable to supply information about the particular purchasable item to the messaging application for communication thereby to the second mobile device. The purchasing option is operable to initiate purchase of the particular purchasable item.

Optionally, the shopping keyboard may be a second shopping keyboard, the shopping application may be configured to display a first shopping keyboard including second keys representing businesses, and the second method may include receiving (by the shopping application) a selection of a particular one of the second keys while the shopping application is displaying the first shopping keyboard, and displaying (by the shopping application) the second shopping keyboard in response to receiving the selection of the particular second key. The particular second key represents a particular business. The purchasable items represented by the third keys are available from the particular business.

Optionally, the shopping keyboard may be configured to display the standard keyboard (on the display of the first mobile device), and the second method may include receiving (by the shopping application) selections of particular ones of the first keys representing a message while the shopping application is displaying the standard keyboard, and supplying (by the shopping application) the message to the messaging application for communication thereby to the second mobile device.

Optionally, the shopping keyboard may be configured to display the standard keyboard on the display of the first mobile device, and the second method may include displaying (by the shopping application) a standard keyboard option (on the display of the first mobile device), receiving (by the shopping application) a selection of the standard keyboard option at a time when the first mobile device is displaying the shopping keyboard, and replacing (by the shopping application) the shopping keyboard with the standard keyboard after receiving the selection of the standard keyboard option.

Optionally, the second method may also include displaying (by the shopping application) a shopping keyboard option (on the display of the first mobile device), and receiving (by the shopping application) a selection of the shopping keyboard option at a time when the first mobile device is displaying the standard keyboard. The standard keyboard may be replaced with the shopping keyboard after the selection of the shopping keyboard option is received. Optionally, the second method may also include, receiving (by the first mobile device) selections of the first keys representing a message after the shopping application has replaced the shopping keyboard with the standard keyboard, and supplying (by the shopping application) the message to the messaging application, which shares the message with the second mobile device.

Embodiments include mobile devices configured to perform the first and second methods.

An embodiment includes a mobile device that includes a touch display, a transceiver, a processor, and a memory. The processor is connected to the touch display and the transceiver. The memory is connected to the processor and includes instructions that are executable by the processor. When executed by the processor, the instructions instruct the processor to perform a method that includes replacing a standard keyboard with a shopping keyboard on the touch display. The standard keyboard includes first keys each representing a letter of an alphabet and the shopping keyboard includes third keys representing purchasable items. Each of the purchasable items includes a product and/or a service. The method also includes receiving (from the touch display) a selection of a particular one of the third keys representing a particular purchasable item, and displaying a sharing option and/or a purchasing option on the touch display in response to the selection of the particular third key. The sharing option is operable to supply information about the particular purchasable item to a messaging application for communication thereby via the transceiver to a different mobile device. The purchasing option is operable to initiate purchase of the particular purchasable item.

Optionally, the shopping keyboard may be a second shopping keyboard, and the method may include displaying (on the touch display) a first shopping keyboard including second keys representing businesses, receiving (from the touch display) a selection of a particular one of the second keys, and displaying (on the touch display) the second shopping keyboard in response to receiving the selection of the particular second key. The particular second key represents a particular business. The purchasable items represented by the third keys is available from the particular business.

Optionally, the method also includes displaying (on the touch display) a standard keyboard option, receiving (from the touch display) a selection of the standard keyboard option at a time when the touch display is displaying the shopping keyboard, and replacing (on the touch display) the shopping keyboard with the standard keyboard after receiving the selection of the standard keyboard option. Optionally, the method further includes displaying (on the touch display) a shopping keyboard option, and receiving (from the touch display) a selection of the shopping keyboard option at a time when the touch display is displaying the standard keyboard. The standard keyboard is replaced with the shopping keyboard after the selection of the shopping keyboard option is received.

BRIEF DESCRIPTION OF THE SEVERAL VIEWS OF THE DRAWING(S)

FIG. 12 is an illustration of an alternate embodiment of the interface of FIG. 2.

FIG. 13 is an illustration of the shopping keyboard of the alternate embodiment of the interface.

DETAILED DESCRIPTION OF THE INVENTION

Figure 1:
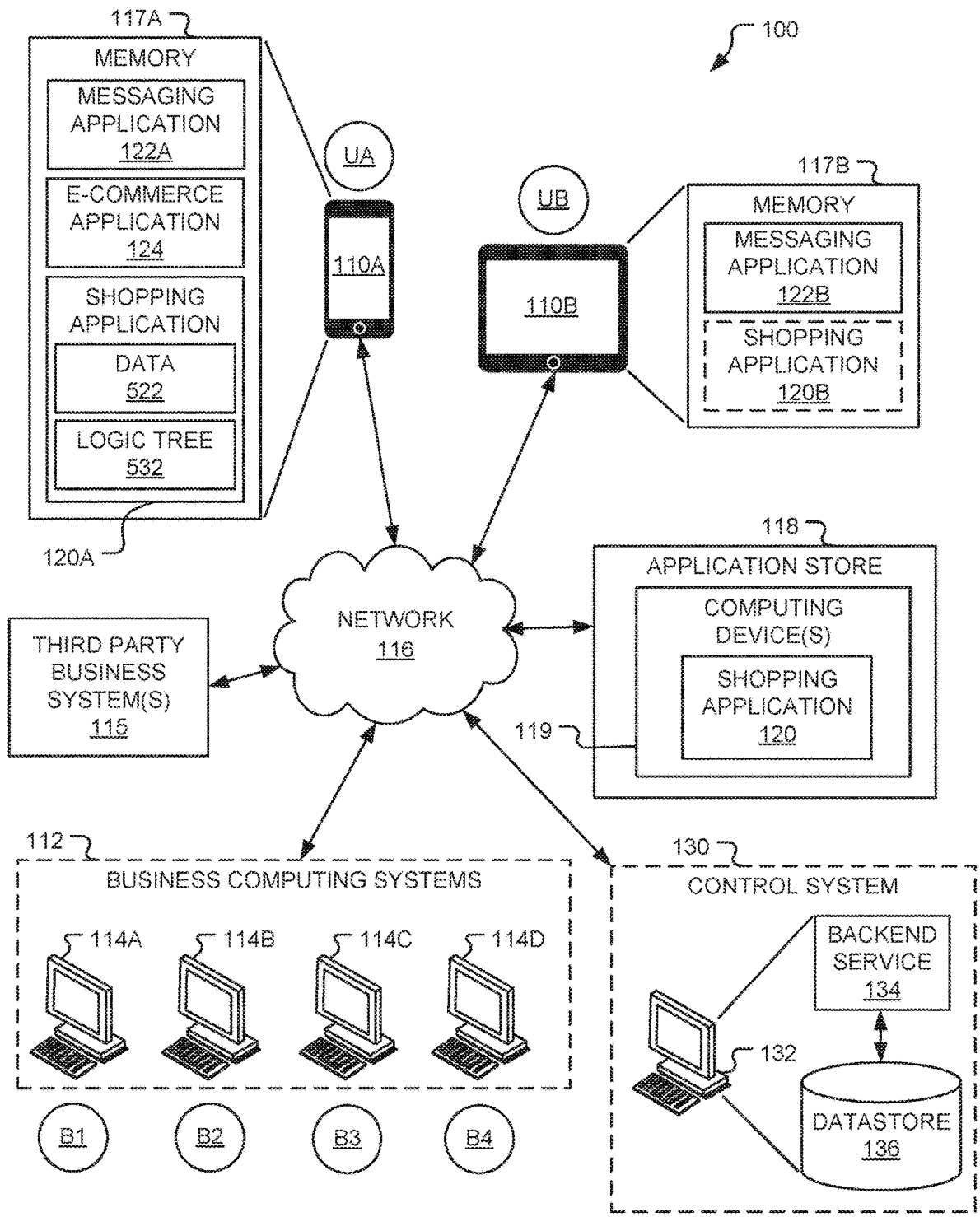
FIG. 1 is a block diagram of a system configured to implement an interface for a mobile device.

FIG. 1 is a block diagram of a system 100 that includes a plurality of mobile devices 110A and 110B operated by users UA and UB, respectively. While FIG. 1 illustrates only the two mobile devices 110A and 110B, the system 100 may include any number of mobile devices. Each of the mobile devices 110A and 110B may be implemented using a mobile communication device 140 (described below and illustrated in FIG. 18). By way of non-limiting examples, the mobile devices 110A and 110B may operate Apple iOS, Google Android, or a similar mobile operating system.

The system 100 also includes one or more business computing systems 114A-114D operated by businesses B1-B4, respectively. The network 116 interconnects the mobile devices 110A and 110B and the business computing systems 114A-114D. While FIG. 1 illustrates only the four business computing systems 114A-114D, the system 100 may include any number of business computing systems. The business computing systems 114A-114D may each be implemented using a computing device 12 (described below and illustrated in FIG. 19).

The businesses B1-B3 may each offer products and/or services for sale. Each of the business computing systems 114A-114C is configured to sell products and/or services to the users UA and UB over a network 116. By way of non-limiting examples, the businesses B1-B3 may operate e-commerce websites implemented by the business computing systems 114A-114C, respectively. These e-commerce websites may be configured to sell products and/or services to the users UA and UB over the network 116. Alternatively or additionally, one or more of the businesses B1-B3 may each provide a different e-commerce application 124 configured to be downloaded (e.g., from an application store 118) and installed on the mobile devices 110A and 110B. Each e-commerce application 124 may be configured to interact with one of the business computing systems 114A-114C. The e-commerce application 124 is configured to sell products and/or services to the users UA and UB over the network 116.

In the example illustrated, the business B4 is a content aggregator (like Linkshare and affiliate systems) and its business computing system 114D is configured to provide information regarding products and/or services sold by one or more third party businesses that each operate a business system 115. The network 116 interconnects the business system(s) 115 and the business computing system 114D. Each of the business system(s) 115 may be implemented using the computing device 12 (described below and illustrated in FIG. 19).

The system 100 also includes at least one application store 118 (e.g., implemented by one or more computing device 119). The computing device 119 may be implemented using the computing device 12 (described below and illustrated in FIG. 19). The application store 118 stores applications (e.g., a shopping application 120) and makes them available for download by (and installation on) the mobile devices 110A and 110B over the network 116. By way of non-limiting examples, the application store 118 may include Apple's Application Store, Google Play Store, and the like.

The mobile devices 110A and 110B include memories 117A and 117B, respectively, configured to store software applications executable by the mobile devices 110A and 110B, respectively. In the embodiment illustrated, the mobile device 110A downloaded and installed the shopping application 120 from the application store 118. Thus, the mobile device 110A has an installed copy 120A of the shopping application 120 stored in the memory 117A. Optionally, the mobile device 110B may have an installed copy 102B of the shopping application 120 stored in the memory 117B.

Additionally, the mobile devices 110A and 110B have installed copies 122A and 122B, respectively, of a messaging application stored in the memories 117A and 117B, respectively. By way of non-limiting examples, the messaging application may include Apple iMessage, Wechat, Tango, Kik Messenger, or a similar messaging application. The mobile devices 110A and 110B use the copies 122A and 122B of the messaging application to exchange messages (e.g., text, image files, sound files, video files, etc.).

The system 100 may include a control system 130 that includes at least one computing system 132. The computing system 132 may be implemented using one or more computing devices like the computing device 12 (described below and illustrated in FIG. 19). The computing system 132 may implement a backend service 134 and a datastore 136.

The backend service 134 may be configured to manage integration (and synchronization of product and/or service information) between each installed copies (e.g., the copies 120A and 120B) of the shopping application 120 and the business computing systems 114A-114D (which may include servers, databases, and/or application programming interfaces ("APIs") depending on how the business computing systems 114A-114D are structured). For example, the backend service 134 is configured to retrieve data from the businesses B1-B3 and store information in the datastore 136. The backend service 134 may request information from one or more of the business computing systems 114A-114D operated by the businesses B1-B4. After the backend service 134 receives the information requested, the backend service 134 may store the requested information in the datastore 136. This may be used to synchronize product information stored in the datastore 136 with the product information stored by the business computing systems 114A-114D. By way of another non-limiting example, the mobile device 110A may request information from the control system 130. The backend service 134 may respond to the request by retrieving the requested information from the datastore 136 and sending the retrieved information to the mobile device 110A.

The business computing system 114D may be configured to receive information regarding the products and/or services sold by one or more third party businesses from the business system(s) 115 and provide that information directly to the backend service 134. The backend service 134 may store this information in the datastore 136. Alternatively, the business computing system 114D may provide this information directly to the copies 120A and 120B of the shopping application for storage thereby.

The backend service 134 may manage orders, security, sharing, customer support, and the like. Alternatively, sharing (described below) may be managed by the copies 122A and 112B of the messaging application. The backend service 134 may include a reporting and analytics system configured to measure system usage, customer behavior, and buying trends. The reporting and analytics system displays usage data, buying trends, and other useful data for optimization and/or improving the system 100. The backend service 134 may include a commissioning, inventory, tracking, and payment system configured to manage payments if the shopping application 120 includes a native payment system. Such a native payment system allows the users UA and UB to checkout and purchase products and/or services without being directed (e.g., via a link) to another application or website to purchase products and/or services. The native payment system may include a shopping cart and checkout process that may be used to implement purchasing. Optionally, the backend service 134 may be configured to manage mobile push notifications sent to the mobile devices 110A and 110B to remind the users UA and UB, respectively, to setup, use, or otherwise engage with the copies 120A and 120B, respectively, of the shopping application 120, if the users UA and UB fail to do so.

Figure 2:
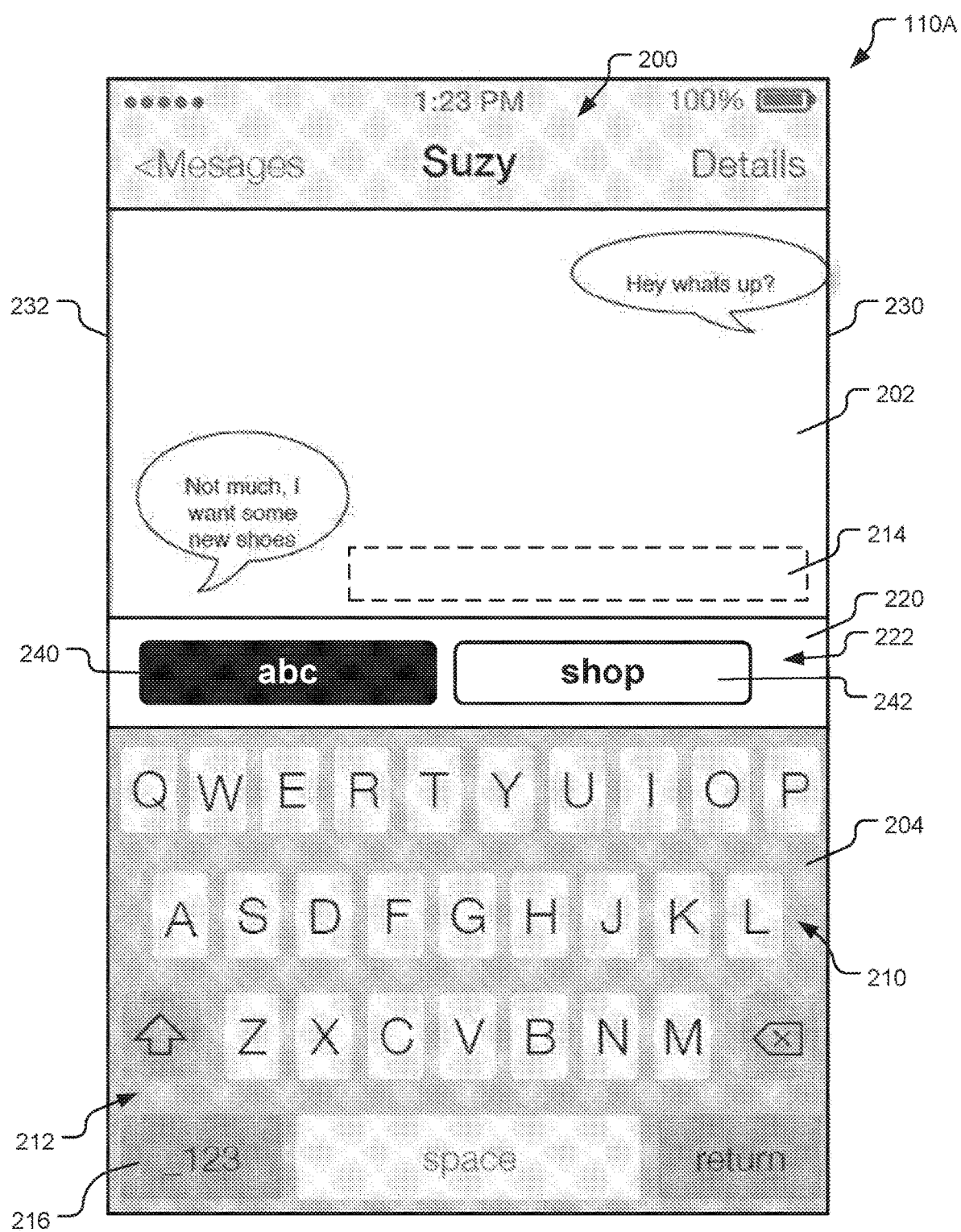
FIG. 2 is an illustration of an interface generated by the mobile device of the system of FIG. 1 and including a messaging interface and a shopping interface.

FIG. 2 illustrates an interface 200 generated by the mobile device 110A (see FIG. 1). For ease of illustration, the interface 200 will be described as being generated by the mobile device 110A (see FIG. 1). However, any mobile device may be configured to generate the interface 200. In the examples illustrated, the interface 200 is displayed by a touch display (e.g., a display 154 illustrated in FIG. 19) configured to receive user input.

The interface 200 includes a messaging interface 202 generated by the copy 122A (see FIG. 1) of the messaging application positioned alongside a shopping interface 220 generated by the copy 120A (see FIG. 1) of the shopping application 120 (see FIG. 1). The interface 200 also includes a keyboard region 204 positioned below the shopping interface 220.

In the example illustrated, the user UA (see FIG. 1) is identified by the name "Suzy" and is using the copy 122A (see FIG. 1) of the messaging application to exchange messages with the user UB (see FIG. 1). The messaging interface 202 displays the most recent messages exchanged between the users UA and UB. Messages input by the user UA appear along a right hand side 230 of the messaging interface 202 and messages input by the user UB appear along a left hand side 232 of the messaging interface 202. In the example illustrated in FIG. 1, the messaging interface 202 displays a question ("Hey what's up?") sent by the user UA to the user UB. The messaging interface 202 also displays a response ("Not much, I want some new shoes") to the question provided by the user UB.

The shopping interface 220 includes one or more keyboard options 222 that are selectable by the user UA (see FIG. 1). In the example illustrated, the keyboard options 222 include a standard keyboard option 240 and a shopping keyboard option 242. When the standard keyboard option 240 is selected, the keyboard region 204 displays a standard keyboard 210. The standard keyboard 210 includes a plurality of selectable first (letter) keys 212. Each of the first keys 212 represents a different letter of an alphabet. As is apparent to those of ordinary skill in the art, each of the copies 122A and 122B (see FIG. 1) of the messaging application is configured to receive input via at least one keyboard. For example, referring to FIG. 2, text may be entered in the messaging interface 202 generated by each of the copies 122A and 122B (see FIG. 1) of the messaging application using the standard keyboard 210. Typically, the standard keyboard 210 appears when the user UA (see FIG. 1) selects an input region 214 of the messaging interface 202. As is apparent to those of ordinary skill in the art, many messaging applications include one or more alternate keyboards (e.g., emoticons, numbers, other characters, etc.) that may be selected to enter different characters. For example, FIG. 2 illustrates a button 216 that may be pressed to replace the standard keyboard 210 with a numeric keyboard (not shown) that includes numbers instead of letters. However, as is apparent to those of ordinary skill in the art, these keyboards provide only special or custom emoticons and virtual stickers. None of these prior art keyboards provide the ability to shop or view products from the keyboard itself.

Figure 3:
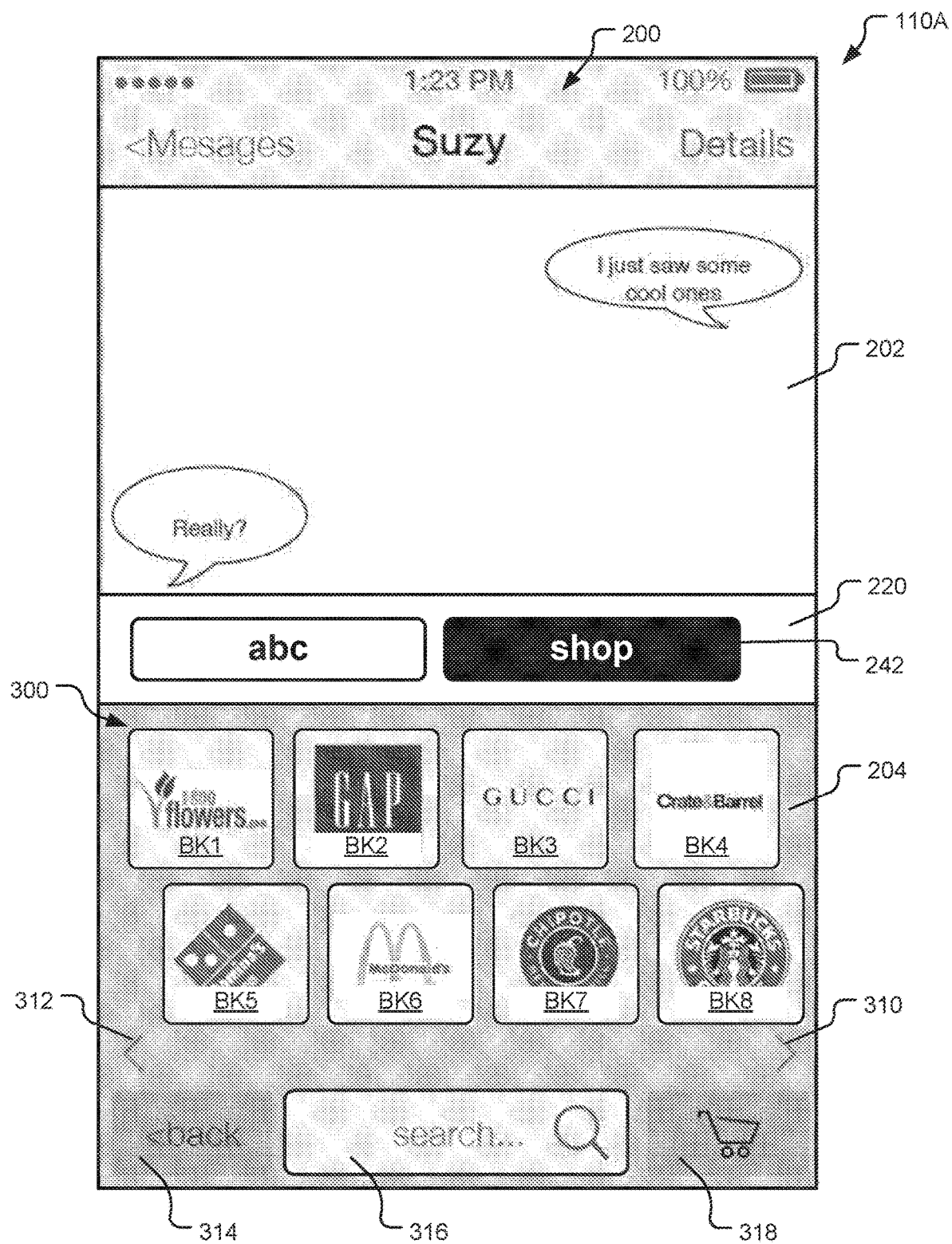
FIG. 3 is an illustration of a shopping keyboard displaying second keys.

Referring to FIG. 3, when the shopping keyboard option 242 is selected, the keyboard region 204 displays a shopping keyboard 300. In other words, the copy 120A of the shopping application replaces the standard keyboard 210 (see FIG. 2) with the shopping keyboard 300. However, the messaging interface 202 continues to display the most recent messages exchanged between the users UA and UB (see FIG. 1). In this example, the messaging interface 202 displays a comment ("I just saw some cool ones") sent by the user UA to the user UB. The messaging interface 202 also displays a question ("Really?") provided by the user UB in response to that comment provided by the user UA.

The shopping keyboard 300 includes a plurality of second (collection) keys BK1-BK8 selectable by the user UA. Each of the second keys BK1-BK8 represents a different collection of products and/or services. For example, each of the second keys BK1-BK8 may represent products and/or services offered by a particular one of the businesses B1-B3 (see FIG. 1). In such embodiments, the second keys BK1-BK8 may each represent a different business or brand. For example, the second keys BK1-BK3 may represent the businesses B1-B3 (see FIG. 1), respectively. The shopping keyboard 300 allows users to select businesses (or brands) using a familiar layout—the standard keyboard. In the embodiment illustrated, the second keys BK1-BK8 each include an image (e.g., a logo) representing the business (or brand) that is represented by the second key.

Figure 4:
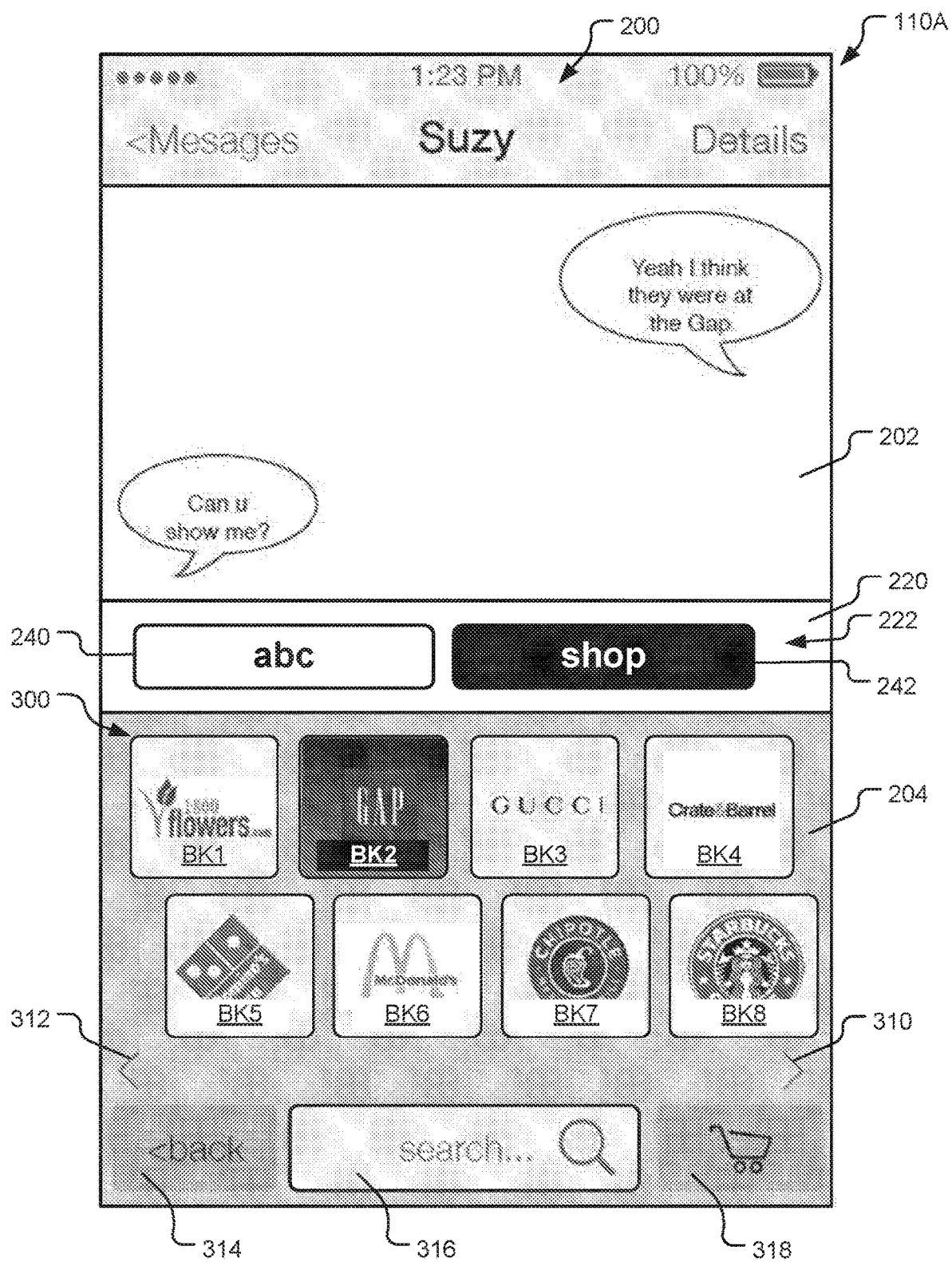
FIG. 4 is an illustration of the shopping keyboard of FIG. 3 with one of the second keys selected.

In FIG. 4, the user UA has selected the standard keyboard option 240 and entered a statement "Yeah I think they were at the Gap" into the copy 122A (see FIG. 1) of the messaging application, which displays this message in the messaging interface 202. In other words, the copy 120A of the shopping application may replace the shopping keyboard 300 with the standard keyboard 210 (see FIG. 2), receive selections of the first keys 212 (see FIG. 2) spelling out a message, and provide the message to the copy 122A (see FIG. 1) of the messaging application for communication thereby to the mobile device 110B (see FIG. 1). Alternatively, the user UA may exit the copy 120A of the shopping application and use the standard keyboard 210 (see FIG. 2) displayed by the copy 122A (see FIG. 1) of the messaging application to enter the message directly into the messaging application.

Then, in response, the user UB entered a question "Can u show me?" into the copy 122B (see FIG. 1) of the messaging application, which communicated the question to the mobile device 110A (see FIG. 1). At this point, the user UA selected the shopping keyboard option 242 thereby replacing the standard keyboard 210 (see FIG. 2) with the shopping keyboard 300 and selected the second key BK2, which represents a particular store (e.g., "the Gap").

Figure 5:
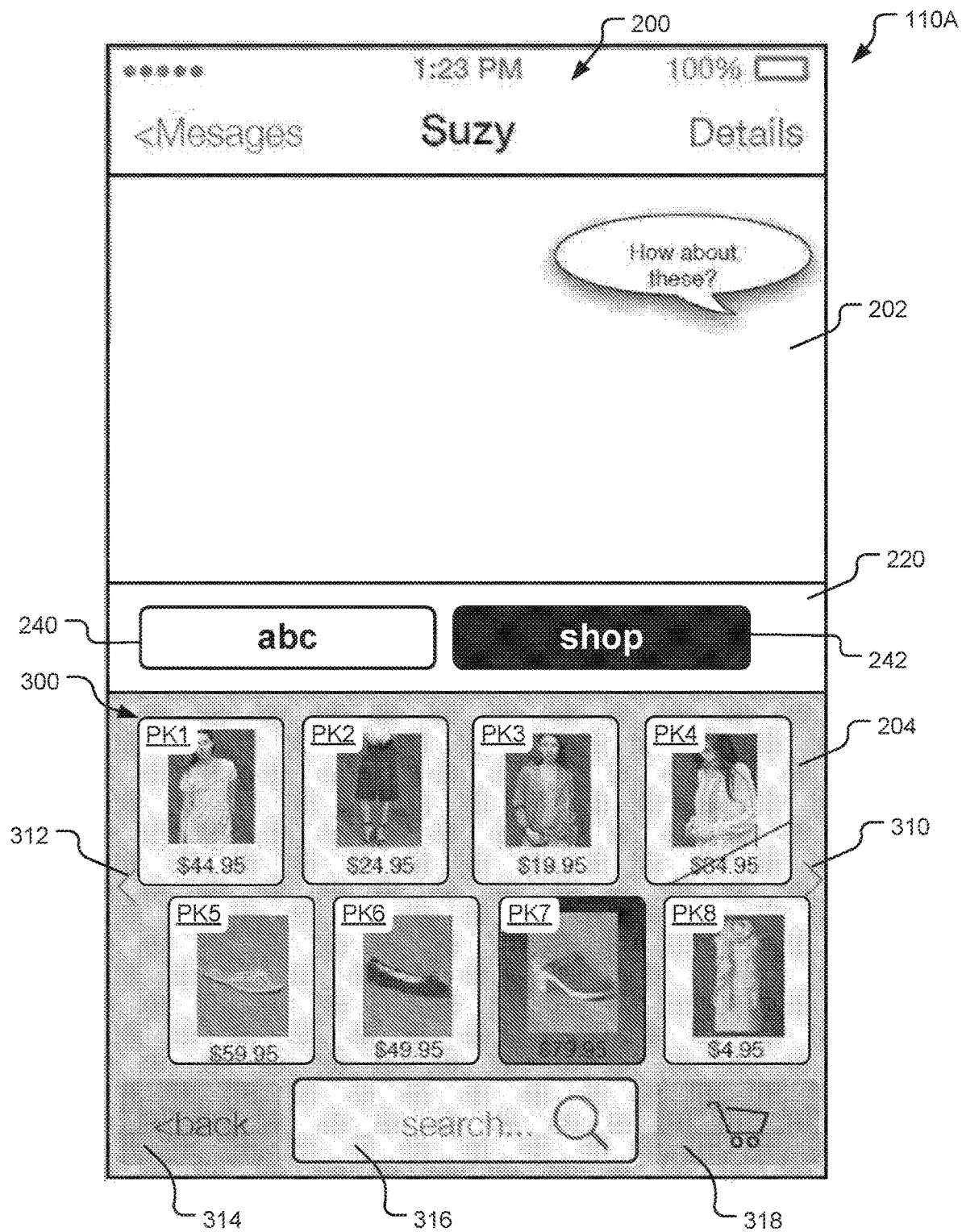
FIG. 5 is an illustration of the shopping keyboard displaying third keys.

When the user UA selects one of the second keys BK1-BK8 (e.g., the second key BK2), the shopping keyboard 300 displays a plurality of third (product) keys PK1-PK8 (see FIGS. 5 and 7) instead of the second (collection) keys BK1-BK8. Thus, when the shopping keyboard 300 displays the second keys BK1-BK8, the shopping keyboard 300 may be characterized as being a first shopping keyboard. Similarly, when the shopping keyboard 300 displays the third keys PK1-PK8, the shopping keyboard 300 may be characterized as being a second shopping keyboard. Referring to FIG. 5, the third keys PK1-PK8 are selectable by the user UA. Each of the third keys PK1-PK8 represents a different product and/or service belonging to the collection of products and/or services represented by the selected second key (e.g., the second key BK2). In the embodiment illustrated, the third keys PK1-PK8 each include an image of the product and/or service represented by the third key.

The shopping keyboard 300 illustrated also includes a forward scroll option 310, a backward scroll option 312, a back option 314, a search option 316, and a shopping cart option 318. The forward and backward scroll options 310 and 312 may be used to scroll through the second keys BK1-BK8 if not all of the second keys BK1-BK8 fit in the keyboard region 204. The back option 314 returns the user UA to a previous screen. The shopping cart option 318 links to a shopping cart for the user UA. The user UA may select the shopping cart option 318 when the user UA wishes to complete a purchase of any items in the shopping cart. The functionality of the shopping cart and completing online purchases are well known to those of ordinary skill in the art and will not be described herein in detail. The search option 316 (e.g., a search input bar or box) may be located at or near a bottom of the shopping keyboard 300. The search option 316 may be used to search for a brand and/or a specific product.

In FIG. 5, the user UA (see FIG. 1) selected the standard keyboard option 240 (see FIG. 2) and entered a question "How about these?" into the copy 122A (see FIG. 1) of the messaging application. Then, the user UA selected the shopping keyboard option 242. This caused the shopping keyboard 300 to display the third keys PK1-PK8. Next, the user UA selected the third key PK7, which represents a particular product and/or service (e.g., a pair of shoes).

Figure 6:
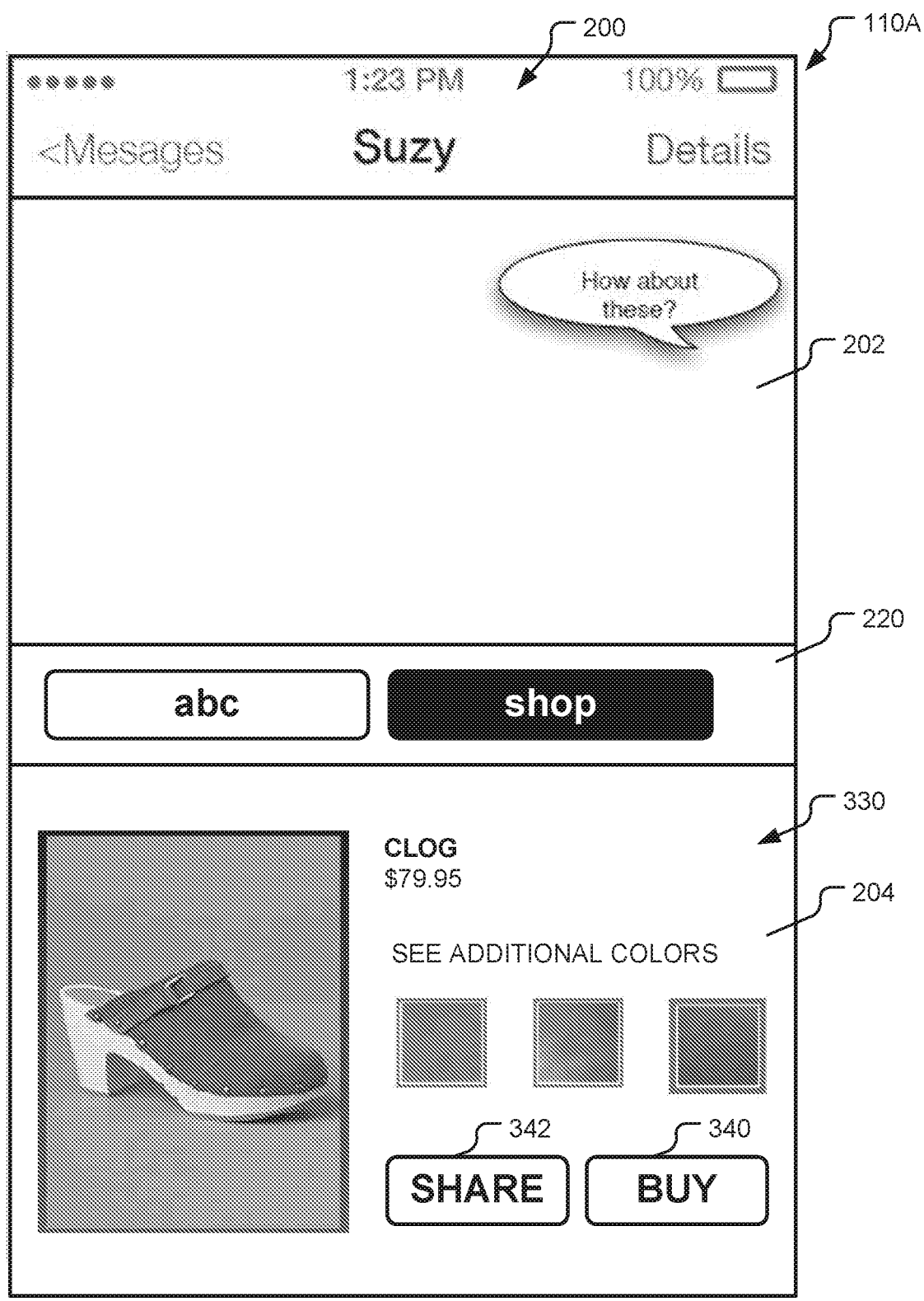
FIG. 6 is an illustration of details about a product and/or service represented by a selected one of the third keys.

Referring to FIG. 6, the copy 120A (see FIG. 1) of the shopping application 120 (see FIG. 1) may display details 330 (e.g., options, information, and the like) with respect to the particular product and/or service (e.g., a pair of shoes) selected by one of the third keys PK1-PK8 (e.g., the third key PK7). In the example illustrated, the details 330 are displayed in the keyboard region 204. The shopping interface 220 may include a purchase option 340 and a sharing option 342. While illustrated as being buttons, the purchase and sharing options 340 may be implemented using other methods.

Figure 8:
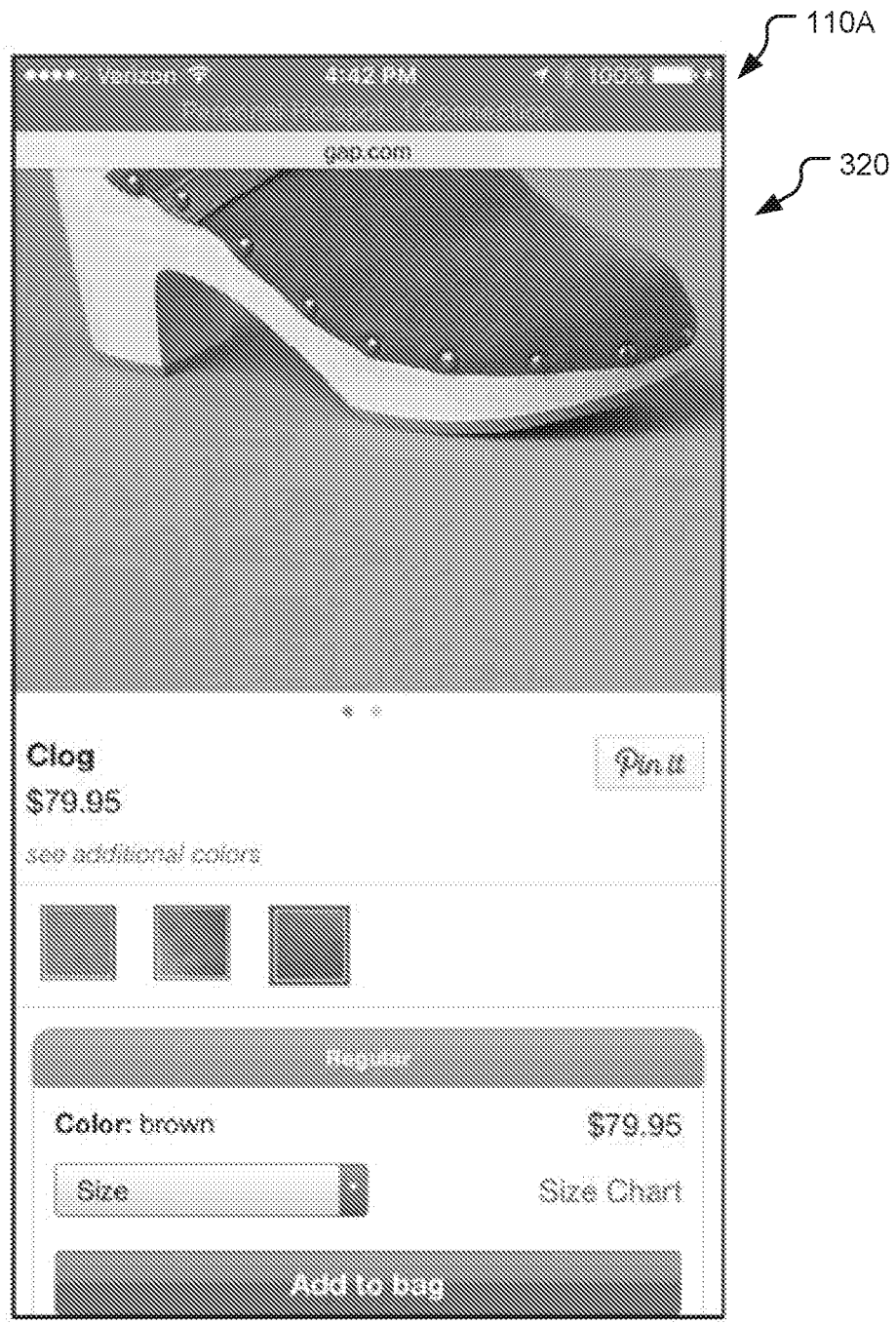
FIG. 8 is a webpage whereat the product and/or service represented by the selected third key is available for purchase.

Selecting the purchase option 340 may redirect the user UA (see FIG. 1) to a website where the particular product and/or service may be purchased. FIG. 8 depicts a webpage 320 of a website (not shown) generated by the business (e.g., the business B2 illustrated in FIG. 1). Selecting the purchase option 340 may redirect the user UA (see FIG. 1) to the webpage 320 where the particular product and/or service may be purchased.

By way of yet another example, referring to FIG. 1, selecting the purchase option 340 (see FIG. 6) may cause the copy 120A of the shopping application to link (e.g., using a deeplink) to the e-commerce application 124 installed on the mobile device 110A. The link opens a relevant page or screen (generated by the e-commerce application 124) on which the product and/or service may be purchased. If the e-commerce application 124 is not installed on the mobile device 110A, the copy 120A of the shopping application links to the application store 118 whereat the user UA can download and install the e-commerce application 124. Optionally, after installation is complete, the copy 120A may cause (e.g., using a deeplink) the e-commerce application 124 to generate the page or screen on which the product and/or service may be purchased.

Alternatively, referring to FIG. 6, selecting the purchase option 340 may add the particular product and/or service to the shopping cart of the user UA. The user UA may choose product options (such as size, color, etc.) and add the particular product and/or service to the shopping cart using the purchase option 340.

Thus, as explained above, the copy 120A (see FIG. 1) of the shopping application 120 (see FIG. 1) may either (a) link to a mobile website or application (e.g., the e-commerce application 124) that the business (e.g., the business B2 illustrated in FIG. 1) uses to sell the product and/or service (e.g., implemented on the business computing system 114B illustrated in FIG. 1), or (b) use the native payment system implemented by the copy 120A (see FIG. 1) of the shopping application 120 (see FIG. 1) or the copy 122A (see FIG. 1) of the message application that the user UA (see FIG. 1) is using. Each of these buying paths follows an accompanying customer service flow that may be managed via the shopping application 120 (see FIG. 1), the control system 130 (see FIG. 1), and/or through a third party such as Apple Pay, Stripe, or a credit card company associated with a captive credit card stored in the control system 130. A captive credit card may be stored in the control system 130 during user account setup and stored by the control system 130 for use during checkout. This is advantageous as it means users do not have to re-enter credit card information each time they want to complete a purchase.

Selecting the sharing option 342 allows the user UA (see FIG. 1) to share information 350 (see FIG. 7) about the particular product and/or service (e.g., a pair of shoes) via the copies 122A and 122B (see FIG. 1) of the messaging application. In the example illustrated, the user UA decided to share the particular product and/or service (e.g., a pair of shoes) with the user UB (see FIG. 1). Optionally, the shopping interface 220 may be configured to allow the user UA to share the contents of the shopping cart, purchases, recommendations, or other related information with the user UB, affiliates, partners, companies, and the like. Referring to FIG. 1, the user UB need not have the copy 120B of the shopping application installed on the mobile device 110B to view information shared by the user UA via the copies 122A and 112B of the message application.

Figure 7:
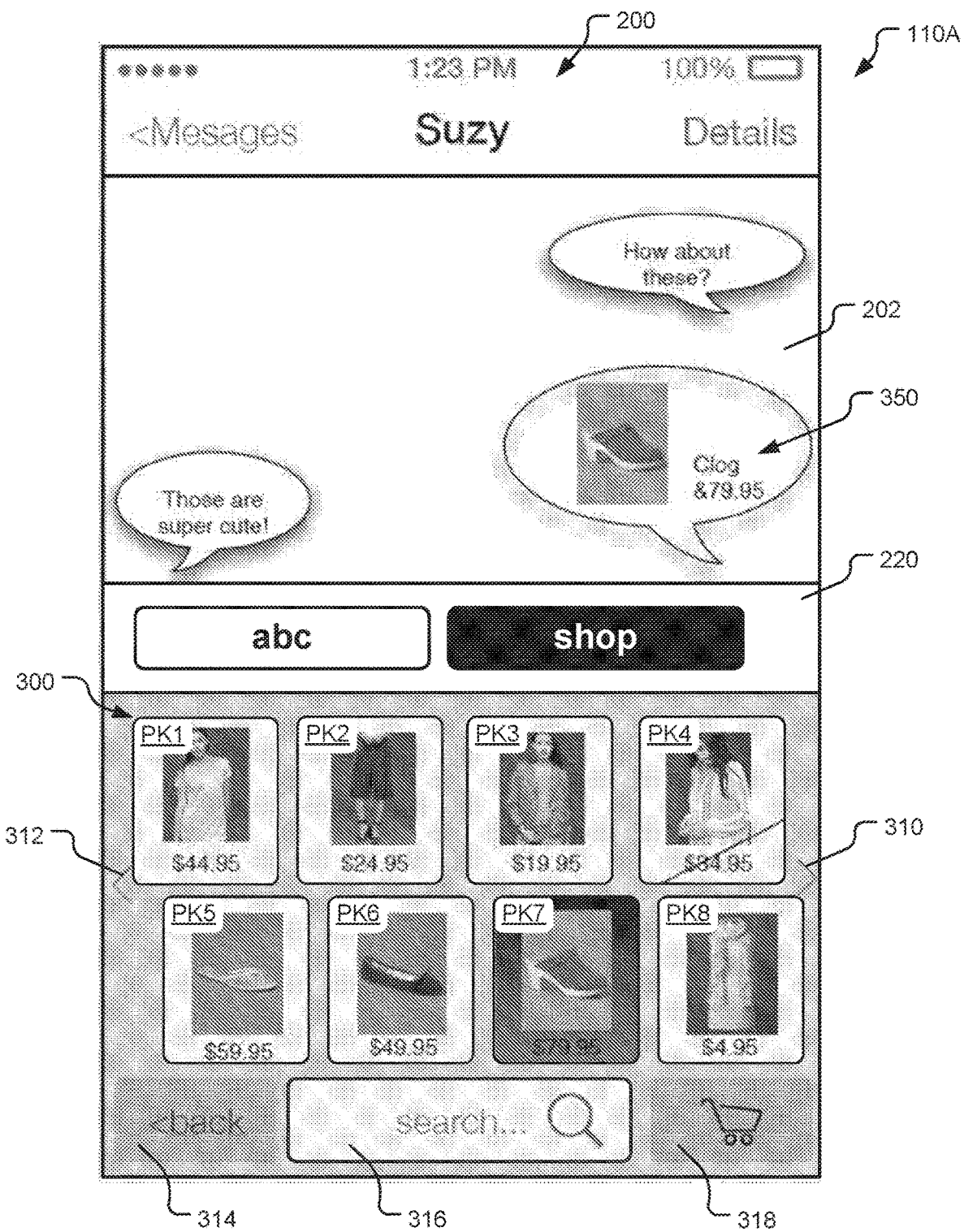
FIG. 7 is an illustration of information about the product and/or service represented by the selected third key that is shared with another user via a messaging application.

By way of a non-limiting example, the user UA may indicate a desire to share the particular product and/or service (e.g., a pair of shoes) with the user UB by first selecting the particular product and/or service (e.g., by pressing the third key PK7) and then selecting the sharing option 342. Referring to FIG. 7, this causes the information 350 about the particular product and/or service represented by the third key PK7 to be displayed by the messaging interface 202 to both the users UA and UB. In the example illustrated, the user UB enters a comment ("Those are super cute!") to the user UA regarding the shared product and/or service.

Thus, the user UA may choose to share a particular product (or SKU) in the messaging interface 202 (e.g., a chat window) with one or more other users (e.g., friends) and obtain opinions from the other users with respect to the particular product. Optionally, one or more of the other users (e.g., the user UB) may select the information 350 in the messaging interface 202, which may trigger the mobile device (e.g., the mobile device 110B) operated by the other user to download the shopping application 120, and/or link to either a website or an application (e.g., the e-commerce application 124) that may be used by the other user to purchase the particular product and/or service.

The shopping keyboard 300 allows the users UA and UB (see FIG. 1) to browse, share, discuss, and shop using a familiar layout—the standard keyboard. This allows the users UA and UB to browse, share, discuss, and shop for products and/or services as easily as the users UA and UB chat with their friends. Further, the shopping keyboard 300 allows the users UA and UB to shop while they chat which provides a significant time savings. Additionally, the shopping keyboard 300 may be configured to allow the users UA and UB to shop using images of products shown on the third keys PK1-PK8 (instead of letters, numbers, or symbols).

The shopping application 120 (see FIG. 1) allows mobile commerce to be accessed, shared, and powered directly from the messaging interface 202 and the shopping keyboard 300. Users (e.g., the user UA) can easily switch between messaging and shopping by selecting the appropriate one of the keyboard options 222. The keyboard options 222 may be selected by pressing a button or making a predetermined gesture (e.g., a swipe). Selecting the shopping keyboard option 242 instructs the copy 120A (see FIG. 1) of the shopping application 120 (see FIG. 1) to invoke and display the shopping keyboard 300 on the mobile device 110A (see FIG. 1).

While the shopping keyboard 300 has been described as being implemented with respect to a messaging application, the shopping keyboard 300 may alternately be implemented on a webpage or web application. Further, the shopping keyboard 300 may be used with any type of application (e.g., an email application, a social networking application, another type of communication application, a shopping application, etc.) that uses a keyboard implemented in an interface as opposed to a hardware keyboard. Additionally, the shopping keyboard 300 may be used with other types of devices, such as vehicles, cars, trucks, buses, airplanes, boats, spaceships or any other system where letters or symbols on keyboards (either physical or virtual) could be substituted for product images, brand icons and logos or other commercial symbols.

While the shopping keyboard 300 has been described as being implemented in an interface (as opposed to a hardware keyboard), the shopping keyboard 300 may be implemented using other types of keyboards (touchbars (similar to MacBook touchbar), virtual reality, and the like). These implementations rely on the same pattern of replacing text symbols on the keys with images or symbols of products (and/or services) and/or brands from which the users may select. Also, the shopping keyboard 300 may be used to display any kind of software button that identifies a product and/or service.

Methods

Figure 9:
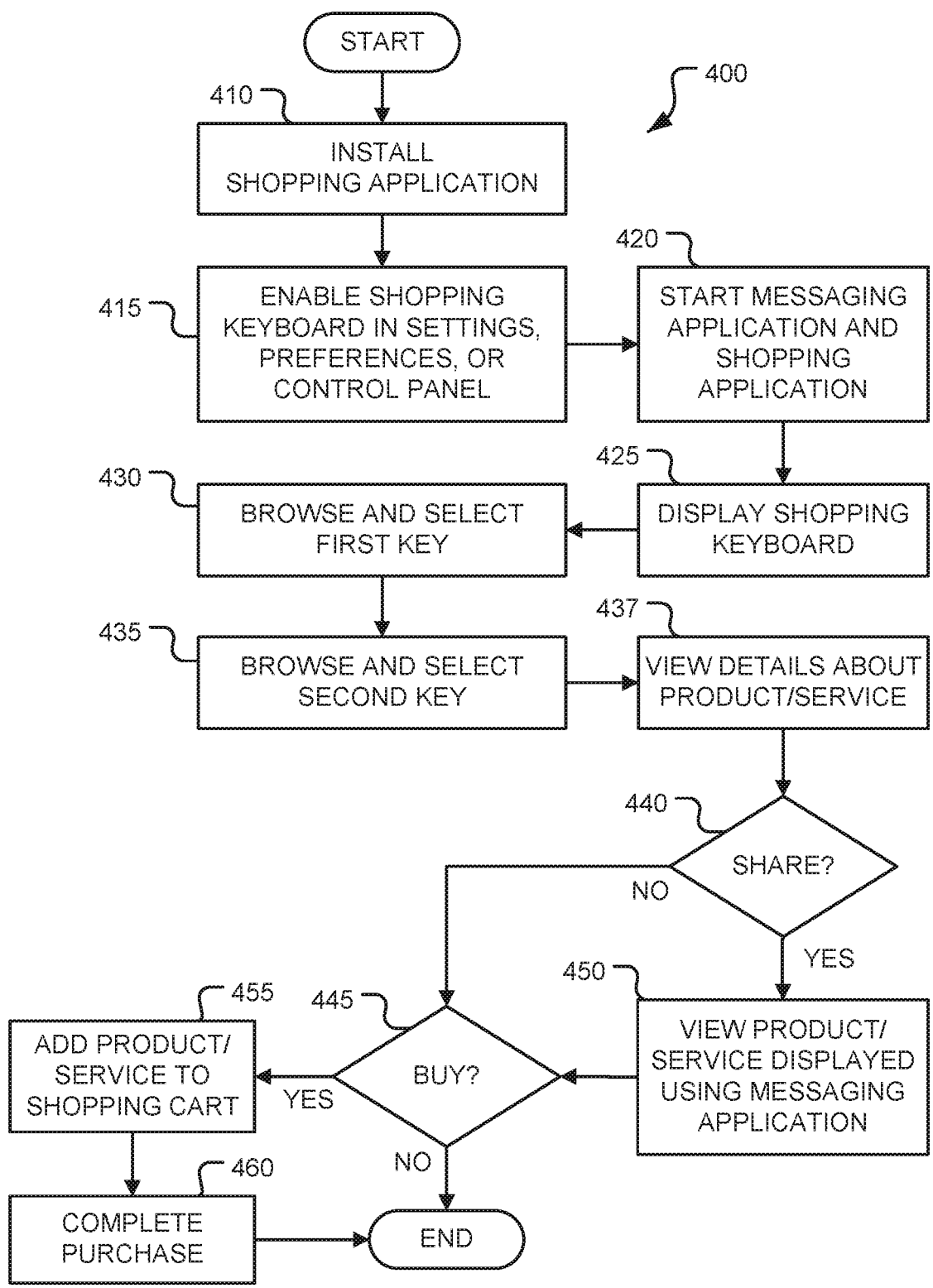
FIG. 9 is a flow diagram of a method performed by a user.

FIG. 9 is a flow diagram of a method 400 performed by the user UA (see FIG. 1). Referring to FIG. 9, in first block 410, the user UA installs the copy 120A of the shopping application 120 on the mobile device 110A. For example, the user UA may download the copy 120A from the application store 118. Alternatively, the copy 120A may be downloaded from a website (not shown).

Figure 10B:
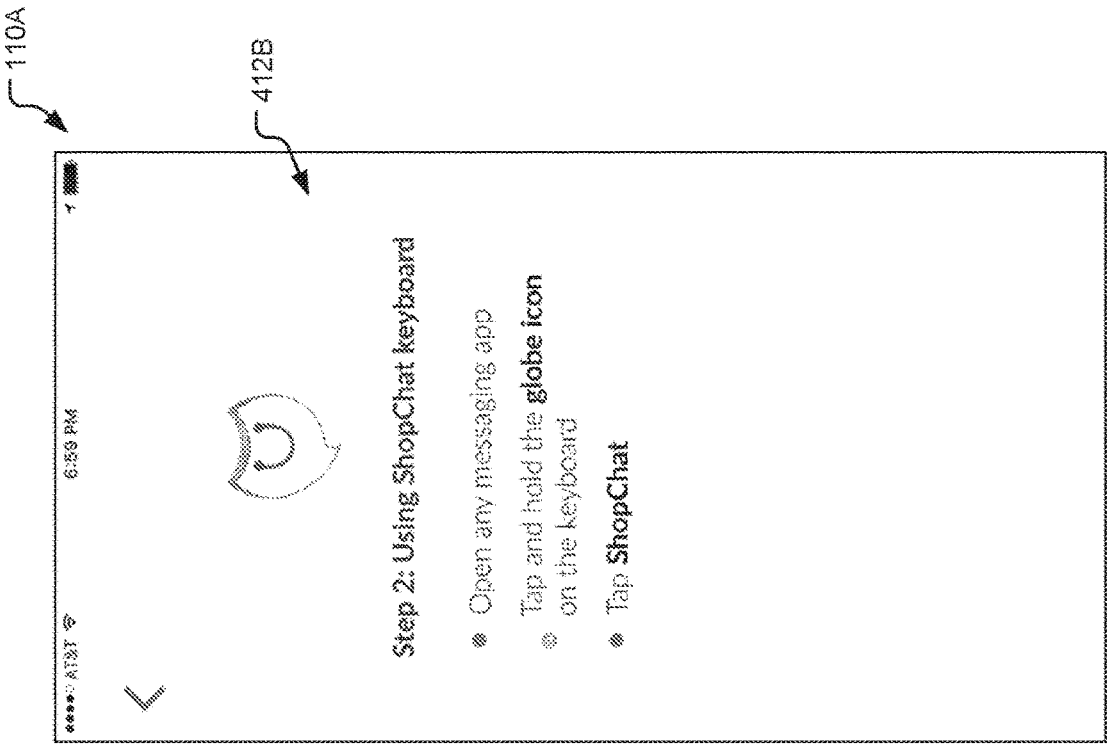
FIG. 10B is a second screen with instructions that explain how to set up the shopping keyboard for use.
Figure 10A:
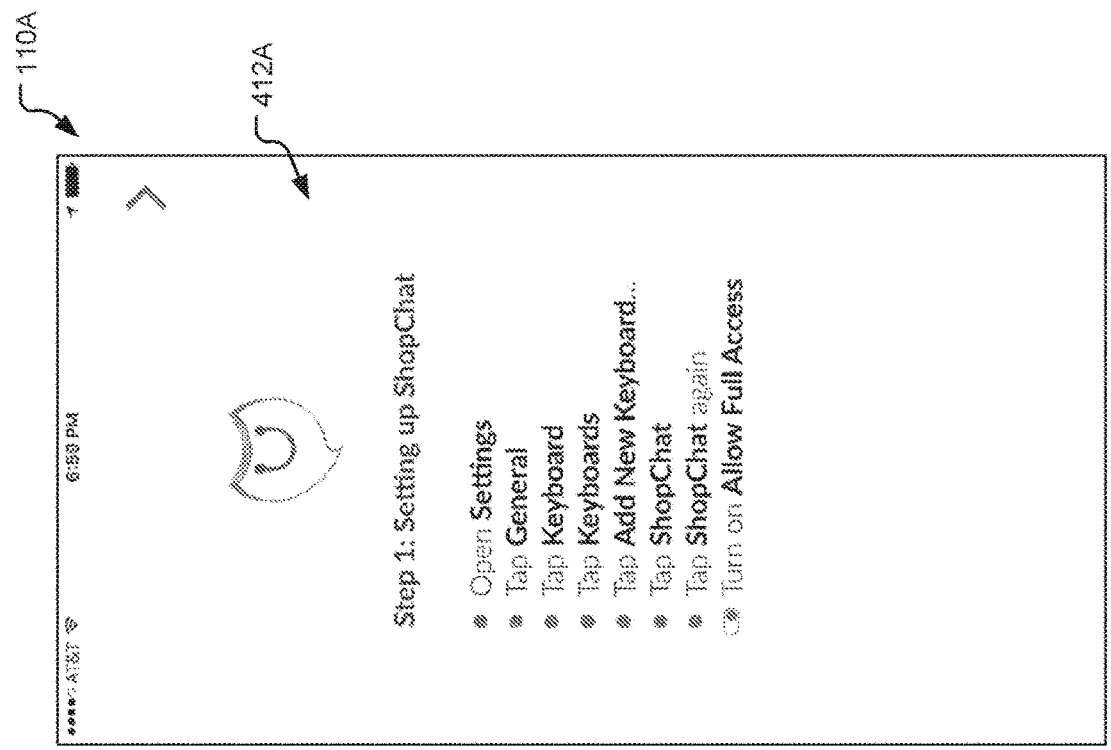
FIG. 10A is a first screen with instructions that explain how to set up the shopping keyboard for use.

The shopping application 120 may implement an installation and setup process that displays one or more dialogs or screens 412A and 412B (see FIGS. 10A and 10B) that explain how to set up the shopping keyboard 300 (see FIGS. 3-5, 7, 13, and 14) for use. In most instances, the user UA must add the shopping keyboard 300 (see FIGS. 3-5, 7, 13, and 14) to a list of available keyboards in settings, preferences, or a control panel of the mobile device 110A (see FIG. 1). In block 415, if necessary, the user UA enables the shopping keyboard 300 (see FIGS. 3-5, 7, 13, and 14) by adding the shopping keyboard 300 to the list of available keyboards.

In block 420, the user UA executes the copy 122A of the messaging application on the mobile device 110A (see FIG. 1). The standard keyboard 210 (see FIG. 2) may be displayed automatically by the copy 122A (see FIG. 1) of the messaging application. The copy 120A of the shopping application may execute automatically when the copy 122A of the messaging application is executed. Alternatively, in block 420, the user UA executes the copy 120A of the shopping application 120 on the mobile device 110A.

Then, in block 425, the user UA directs the copy 120A of the shopping application 120 to display the shopping keyboard 300 (see FIGS. 3-5, 7, 13, and 14). In block 425, the user UA may direct the copy 120A of the shopping application 120 to display the shopping keyboard 300 by selecting the shopping keyboard option 242, scrolling through a list of available keyboards, and the like.

In block 430, the user UA selects one of the second keys BK1-BK8 (see FIGS. 3 and 4), which causes the mobile device 110A to display the third keys PK1-PK8 (see FIGS. 5 and 7).

In block 435, the user UA browses the third keys PK1-PK8 (see FIGS. 5 and 7) and selects one of the third keys PK1-PK8 (e.g., the third key PK7). The copy 120A of the shopping application 120 may direct the mobile device 110A to display details 330 (see FIG. 6) about the product and/or service associated with the selected third key.

In block 437, the user UA views the details 330 (see FIG. 6). Next, the user UA decides whether to share or purchase the product and/or service associated with the selected third key. For ease of illustration, in FIG. 9, the user UA first decides (in decision block 440) whether to share information about the product and/or service associated with the selected third key before deciding (in decision block 445) whether to purchase the product and/or service. However, the order of these decisions may be reversed.

In decision block 440, the user UA decides whether the user UA would like to share the associated product and/or service with another user (e.g., the user UB). The decision in decision block 440 is "YES" when the user UA decides to share the associated product and/or service. Otherwise, the decision in decision block 440 is "NO."

When the decision in decision block 440 is "NO," the user UA advances to decision block 445. On the other hand, when the decision in decision block 440 is "YES," in block 450, the associated product and/or service is shared with the other user(s) (e.g., the user UB) via the copy 122A (see FIG. 1) messaging application. For example, referring to FIG. 7, the messaging application may display the information 350 to the user UB and optionally to the user UA. Then, returning to FIG. 9, the user UA advances to decision block 445.

In decision block 445, the user UA decides whether to buy the associated product and/or service. The decision in decision block 445 is "YES" when the user UA decides to buy the associated product and/or service. Otherwise, the decision in decision block 445 is "NO."

When the decision in decision block 445 is "NO," the method 400 terminates. On the other hand, when the decision in decision block 445 is "YES," in block 455, the user UA selects the purchase option 340, which may add the associated product and/or service to the shopping cart or initiate a similar checkout process. For example, the purchase may occur via another application, a website, and/or the shopping cart. By way of a non-limiting example, selecting the purchase option 340 may forward the user UA to the webpage 320 (see FIG. 8) on the website operated by the business. The webpage 320 is associated with the product and/or service associated with the selected third key and the product and/or service is purchasable from the webpage 320. Alternatively, selecting the purchase option 340 may open the e-commerce application 124 (see FIG. 1), which displays a page on which the product and/or service may be purchased.

In block 460, the user UA completes the purchase. Optionally, in the block 460, the mobile device 110A may display a confirmation screen showing success or errors in the shopping form to be corrected as well as order status and other details. Then, the method 400 terminates.

Figure 11:
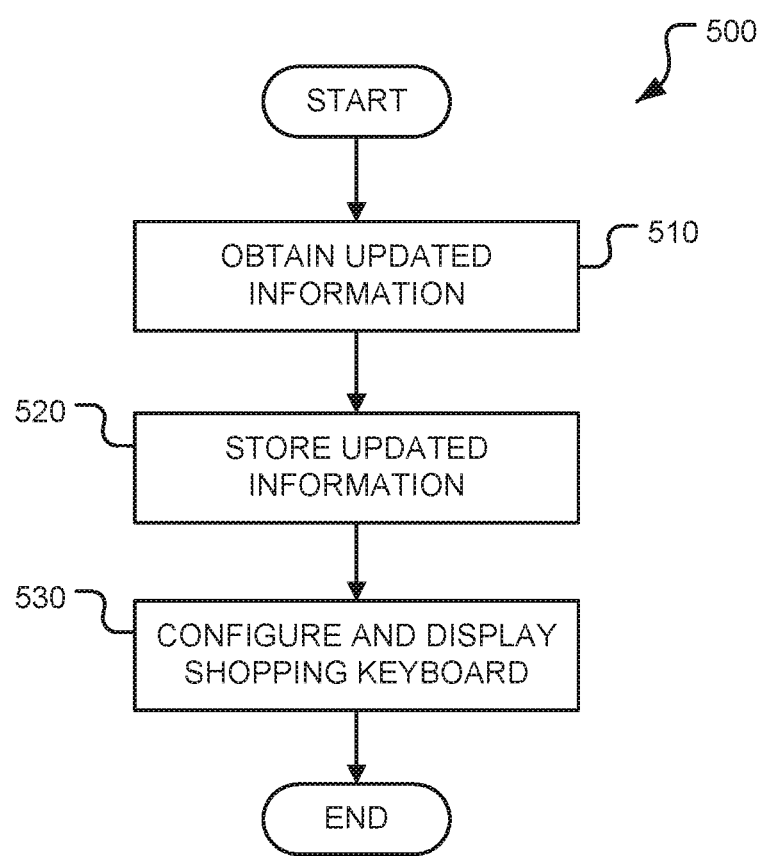
FIG. 11 is a flow diagram of a method performed by a copy of a shopping application installed on the mobile device of the system of FIG. 1.

FIG. 11 is a flow diagram of a method 500 performed by the copy 120A (see FIG. 1) of the shopping application 120 (see FIG. 1). First block 510 begins after the user UA has installed and configured the copy 120A (see FIG. 1) of the shopping application 120 (see FIG. 1) on the mobile device 110A (e.g., after blocks 410 and 415 of the method 400 illustrated in FIG. 9).

In first block 510, the copy 120A (see FIG. 1) pulls updated information from one or more of the business computing systems 114A-114D (see FIG. 1) or the backend service 134. In other words, the updated information may be received directly from the backend service 134 or the business computing systems 114A-114D (see FIG. 1) operating as servers and/or via APIs. In implementations in which the copy 120A (see FIG. 1) pulls the updated information from the backend service 134, before the method 500 begins, the backend service 134 requests updated information from one or more of the business computing systems 114A-114D operated by the businesses B1-B4. After the backend service 134 receives the updated information, the backend service 134 stores the requested updated information in the datastore 136. Thus, product information stored in the datastore 136 may be synchronized with product information stored by the businesses B1-B4 (e.g., in the business computing systems 114A-114D). Next, the mobile device 110A requests the updated information from the control system 130. The backend service 134 responds to the request by retrieving the requested information from the datastore 136 and sending the retrieved information to the mobile device 110A.

The updated information may identify one or more additional collections of products and/or services (e.g., brands), one or more additional products and/or services, updated information (e.g., price) with respect to one or more of the collections of products and/or services, updated information (e.g., price) with respect to one or more of the products and/or services, and the like.

In next block 520, the copy 120A (see FIG. 1) stores the updated information in a data storage location 522 (see FIG. 1), such as a database stored locally on the mobile device 110A, a database stored on a server (not shown) that the copy 120A (see FIG. 1) is configured to access, and the like.

In next block 530, the copy 120A (see FIG. 1) uses the data storage location 522 (see FIG. 1) to configure the shopping keyboard 300. By way of a non-limiting example, the shopping keyboard 300 may be implemented using a cascading logic tree 532 (see FIG. 1) that is populated with (a) one or more of the collections of products and/or services (e.g., brands) and (b) the products and/or services (e.g., SKUS) belonging to each collection. In block 530, the copy 120A (see FIG. 1) populates the cascading logic tree 532. Thus, when the shopping keyboard 300 is next displayed, the shopping keyboard 300 will include the updated information obtained in block 510. Referring to FIG. 1, the copy 120A may interact with the data storage location 522 to show products, sizes, and availability for each brand and SKU as the user UA browses and selects products using the shopping keyboard 300. Then, the method 500 terminates.

Alternate Embodiment

FIGS. 12-17 depict an alternate embodiment of the interface 200 generated by the mobile device 110A (see FIG. 1). In the example illustrated, the user UA (see FIG. 1) is using the copy 122A (see FIG. 1) of the messaging application to exchange messages with the user UB (see FIG. 1).

Referring to FIG. 12, in this embodiment, the interface 200 includes a selectable option 600 that may be selected to enter and exit the shopping interface 220. When, as in FIG. 12, the interface 200 is not displaying the shopping interface 220, the selectable option 600 may be selected by the user UA, which will cause the interface 200 to display the shopping interface 220 (see FIGS. 2-7 and 13-17). Referring to FIG. 13, on the other hand, when the interface 200 is displaying the shopping interface 220, the user UA may select the selectable option 600, which causes the interface 200 to no longer display the shopping interface 220 (see FIGS. 2-7 and 13-17). In this embodiment, the shopping interface 220 is positioned below the keyboard region 204, which is positioned under the messaging interface 202.

In addition to the standard keyboard option 240 and the shopping keyboard option 242, the shopping interface 220 includes a liked items option 604 and a backspace option 608. The liked items option 604 allows the user UA to view any products and/or services that the user UA has liked. The backspace option 608 deletes characters from the input region 214 of the messaging interface 202.

FIG. 13 depicts the keyboard region 204 immediately after the shopping keyboard option 242 has been selected. In addition to the second (collection) keys BK1-BK4, the keyboard region 204 also displays the third (product) keys PK6-PK8 under the second keys BK1-BK4. The third keys PK6-PK8 may be selected for display under the second keys BK1-BK4 based on any criteria. For example, the third keys PK6-PK8 may represent the most frequently shared and/or purchased products and/or services. Alternatively, the businesses B1-B3 (see FIG. 1) may pay a fee to have their products and/or services displayed below the second keys BK1-BK4. The shopping keyboard 300 may be scrolled by swiping right or left in the keyboard region 204.

Figures 14, 15:
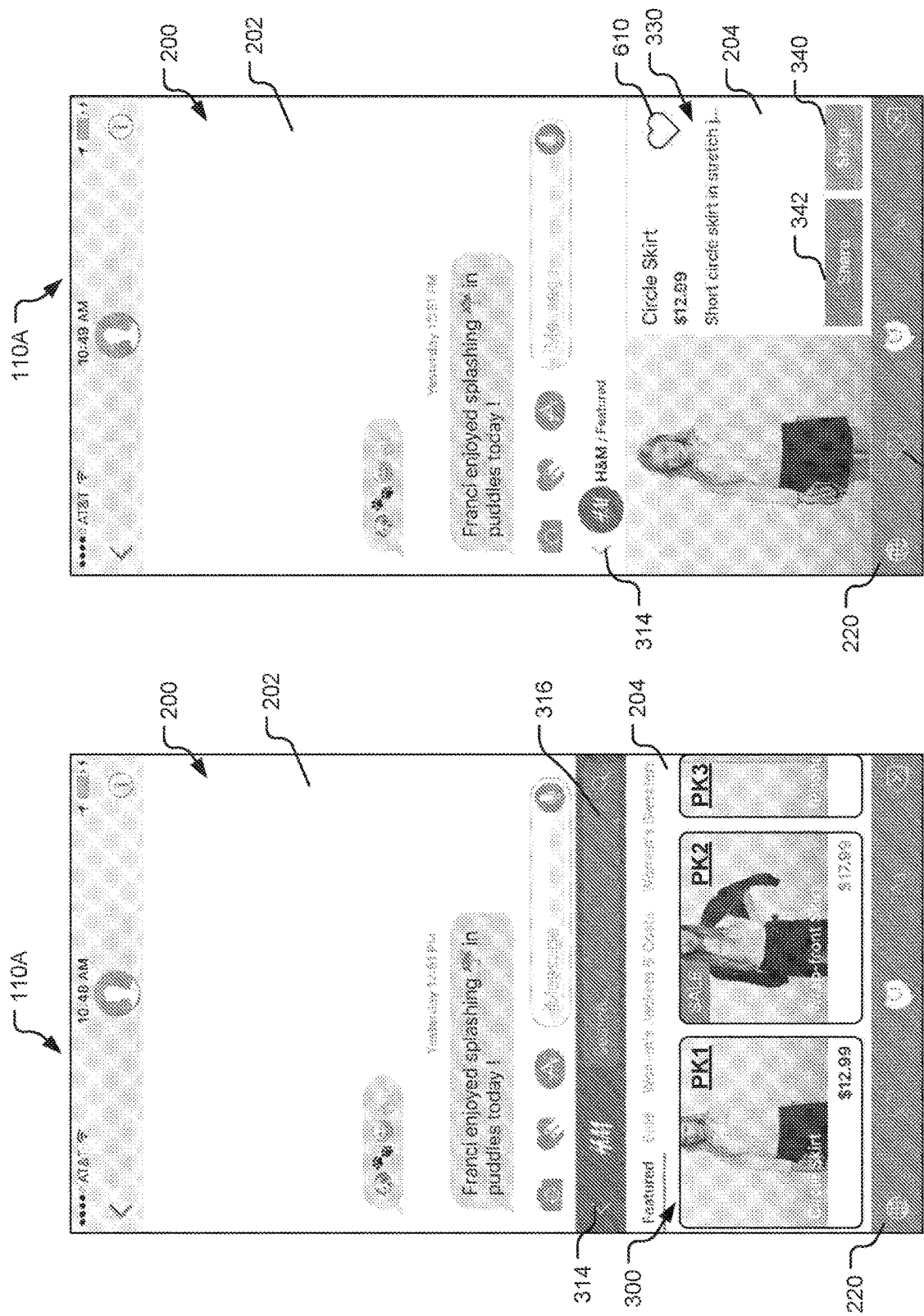
FIG. 14 is an illustration of the shopping keyboard of the alternate embodiment of the interface illustrated after one of the second keys has been selected.
FIG. 15 is an illustration of the shopping keyboard of the alternate embodiment of the interface illustrated after one of the third keys has been selected.

FIG. 14 depicts the keyboard region 204 after one of the second keys BK1-BK4 (e.g., the second key BK2) has been selected by the user UA. Like in the first embodiment, the keyboard region 204 displays the third keys PK1-PK3, which each represent a product and/or service belonging to the collection represented by the second key (e.g., the second key BK2) selected.

FIG. 15 depicts the keyboard region 204 after one of the third keys PK1-PK3 (e.g., the third key PK1) has been selected by the user UA. Like in the first embodiment, the keyboard region 204 displays the details 330 with respect to the particular product and/or service (e.g., a circle skirt) selected by one of the third keys PK1-PK3 (e.g., the third key PK1), the purchase option 340, and the sharing option 342. However, in this embodiment, the keyboard region 204 also displays a like option 610. If the user UA selects the like option 610, the product and/or service (e.g., the circle skirt) is added to a list of liked items that is viewable by selecting the liked items option 604.

Figures 16, 17:
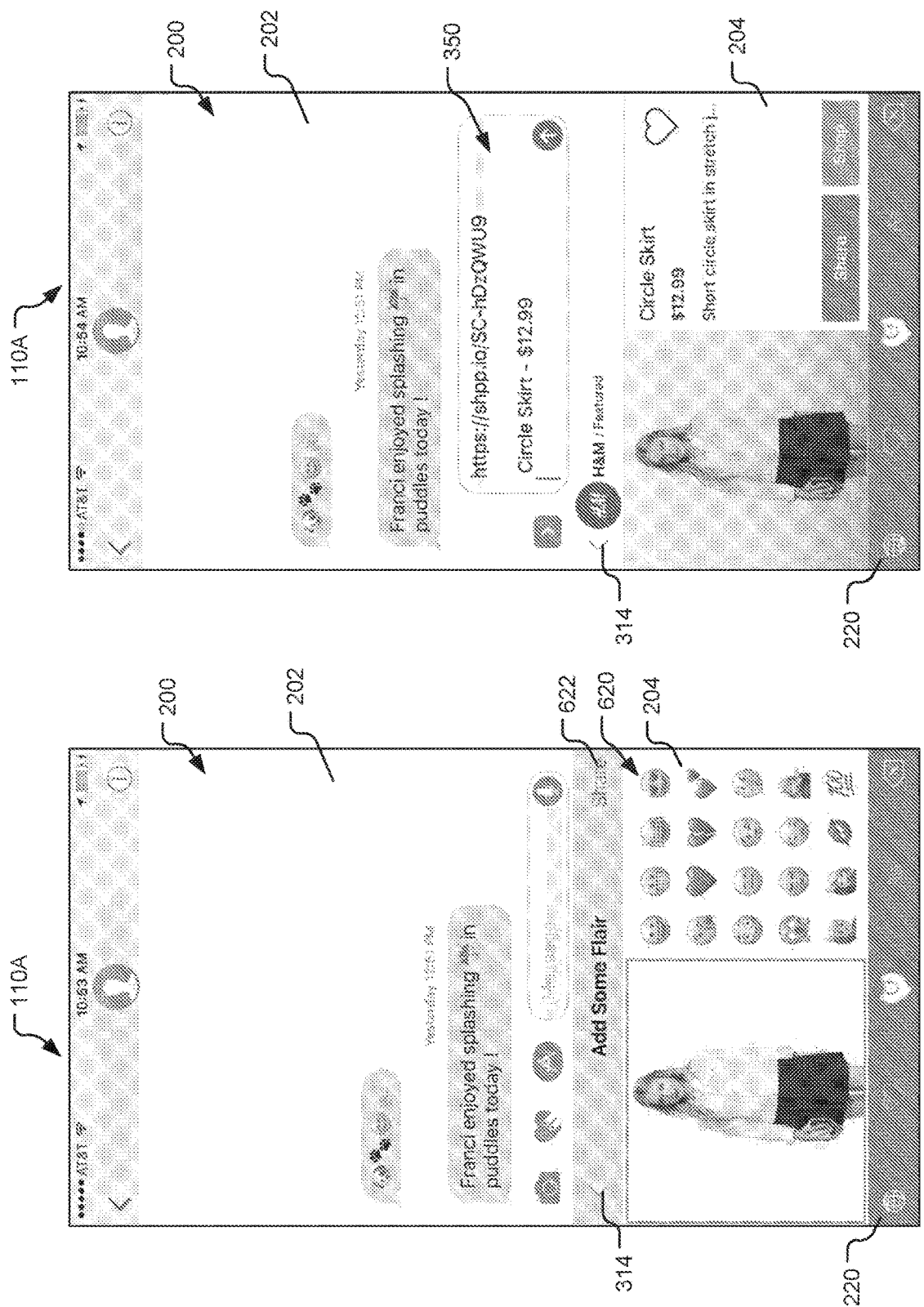
FIG. 16 is an illustration of the shopping keyboard of the alternate embodiment of the interface illustrated after a sharing option has been selected.
FIG. 17 is an illustration of information shared after a second sharing option has been selected in the alternate embodiment of the interface.

FIG. 16 depicts the keyboard region 204 after the sharing option 342 has been selected by the user UA. The keyboard region 204 may display one or more symbols 620 (e.g., emoticons) that may be added to the information 350 (see FIG. 17) shared with the user UB (see FIG. 1). In this embodiment, a second sharing option 622 is displayed in the keyboard region 204. Selecting the second sharing option 622 causes the information 350 about the particular product and/or service represented by the third key PK1 to be displayed by the messaging interface 202 to both the users UA and UB.

Mobile Device

Figure 18:
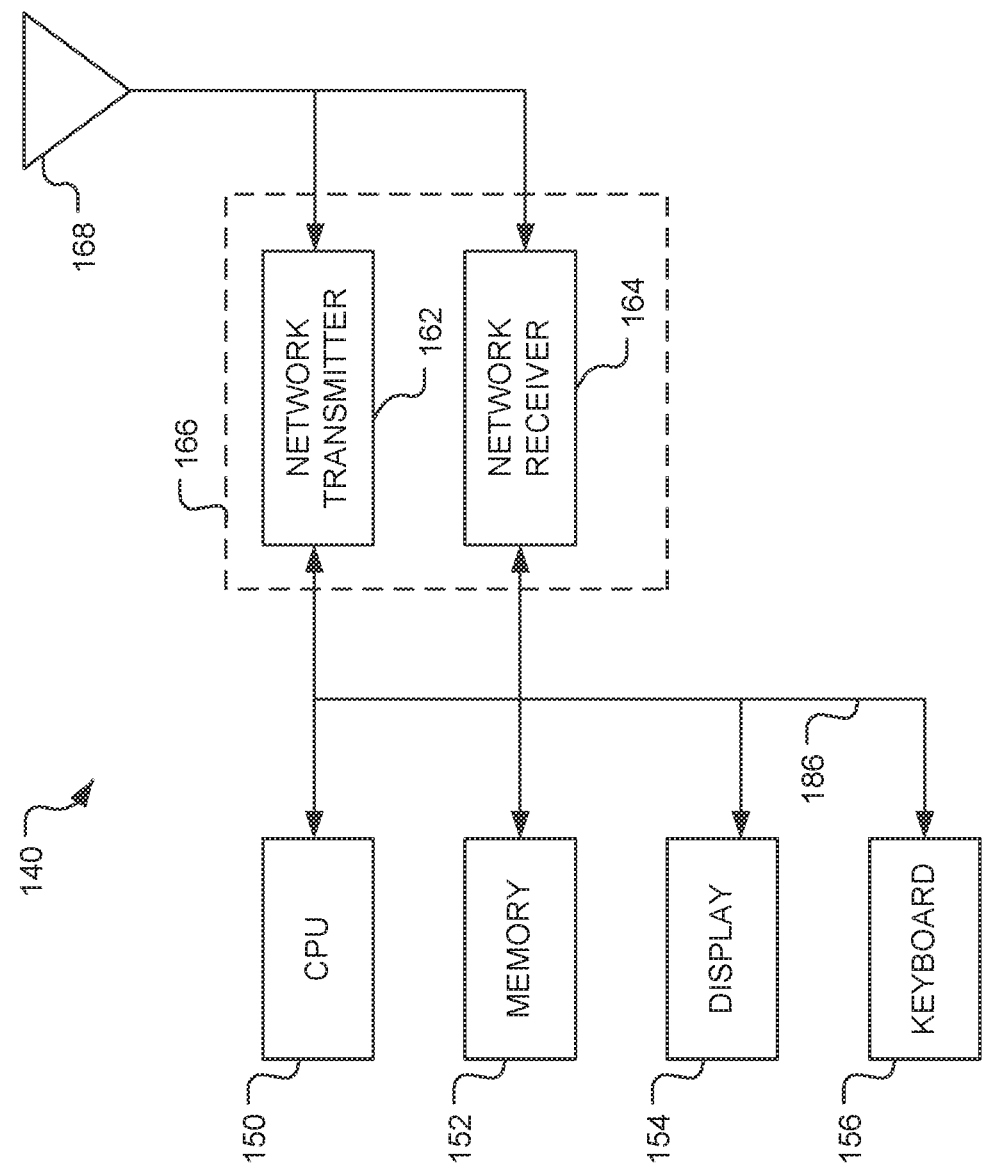
FIG. 18 is a diagram of a hardware environment and an operating environment in which the mobile devices of the system of FIG. 1 may be implemented.

FIG. 18 is a functional block diagram illustrating the mobile communication device 140 that may be used to implement the mobile devices 110A and 110B (see FIG. 1). By way of non-limiting examples, the mobile communication device 140 may be implemented as a cellular telephone, a tablet computer, and the like. The mobile communication device 140 includes a central processing unit (CPU) 150. Those skilled in the art will appreciate that the CPU 150 may be implemented as a conventional microprocessor, application specific integrated circuit (ASIC), digital signal processor (DSP), programmable gate array (PGA), or the like. The mobile communication device 140 is not limited by the specific form of the CPU 150.

The mobile communication device 140 also contains a memory 152. The memory 152 may store instructions and data to control operation of the CPU 150. The memory 152 may include random access memory, ready-only memory, programmable memory, flash memory, and the like. The mobile communication device 140 is not limited by any specific form of hardware used to implement the memory 152. The memory 152 may also be integrally formed in whole or in part with the CPU 150. The memories 117A and 117B (see FIG. 1) may each be implemented using the memory 152.

The mobile communication device 140 also includes conventional components, such as the display 154 and keypad or keyboard 156. These are conventional components that operate in a known manner and need not be described in greater detail. The display 154 may be implemented as a touch display or touchscreen configured to receive user input (e.g., selections of the first, second, third keys 212, BK1-BK8, and PK1-PK8). The display 154 is operable to display the interface 200 (see FIGS. 2-7 and 12-17), including the messaging interface 202, the shopping interface 220, and the shopping keyboard 300. The memory 152 stores computer executable instructions that when executed by the CPU 150 cause the CPU 150 to generate the screens and interfaces (e.g., the screens 412A and 412B and the interfaces 200, 202, and 220) described above. Such instructions may be stored on one or more non-transitory computer-readable media. Other conventional components found in wireless communication devices, such as a USB interface, Bluetooth interface, camera/video device, infrared device, and the like, may also be included in the mobile communication device 140. For the sake of clarity, these conventional elements are not illustrated in the functional block diagram of FIG. 18.

The mobile communication device 140 also includes a network transmitter 162 such as may be used by the mobile communication device 140 for normal network wireless communication with a base station (not shown). FIG. 18 also illustrates a network receiver 164 that operates in conjunction with the network transmitter 162 to communicate with the base station (not shown). In a typical embodiment, the network transmitter 162 and network receiver 164 are implemented as a network transceiver 166. The network transceiver 166 is connected to an antenna 168. Operation of the network transceiver 166 and the antenna 168 for communication with a wireless network (not shown) is well-known in the art and need not be described in greater detail herein. The network 116 (see FIG. 1) may be implemented as or include the wireless network.

The mobile communication device 140 may also include a conventional geolocation module (not shown) operable to determine the current location of the mobile communication device 140.

The various components illustrated in FIG. 18 are coupled together by a bus system 186. The bus system 186 may include an address bus, data bus, power bus, control bus, and the like. For the sake of convenience, the various busses in FIG. 18 are illustrated as the bus system 186.

The memory 152 may store instructions executable by the CPU 150. The instructions may implement portions of one or more of the methods 400 and 500 illustrated in FIGS. 9 and 11, respectively. Such instructions may be stored on one or more non-transitory computer or processor readable media.

Computing Device

Figure 19:
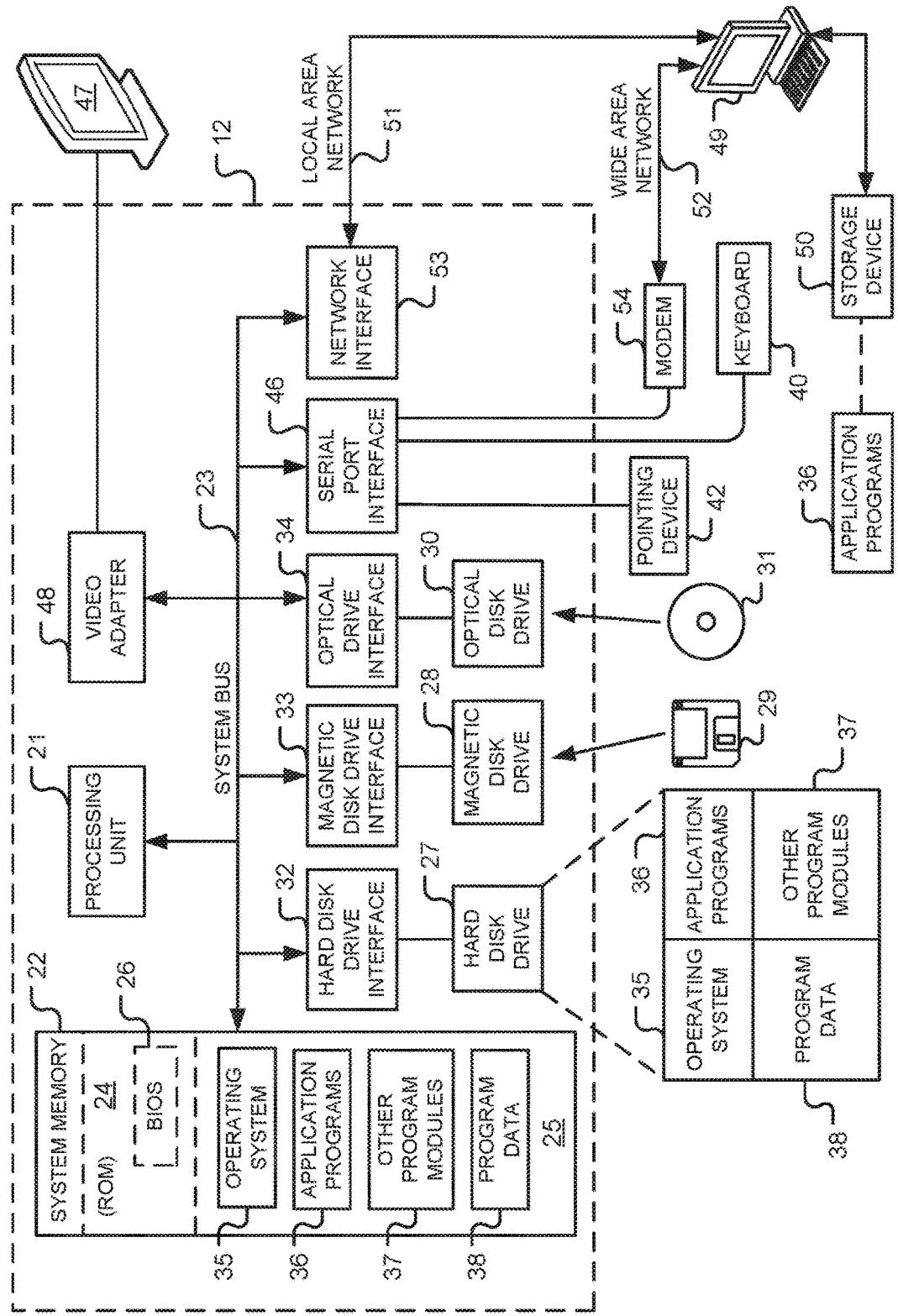
FIG. 19 is a diagram of a hardware environment and an operating environment in which the computing devices of the system of FIG. 1 may be implemented.

FIG. 19 is a diagram of hardware and an operating environment in conjunction with which implementations of the one or more computing devices (e.g., the business computing systems 114A-114D, the business system(s) 115, the computing device 119, and the computing system 132 illustrated in FIG. 1) of the system 100 (see FIG. 1) may be practiced. The description of FIG. 19 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 19 includes a general-purpose computing device in the form of the computing device 12. Each of the computing devices of FIG. 1 (including the business computing systems 114A-114D, the business system(s) 115, the computing device 119, and the computing system 132) may be substantially identical to the computing device 12 (see FIG. 19). Referring to FIG. 19, by way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feedback game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 19 include a local-area network (LAN) 51 and a wide-area network (WAN) 52. Such networking environments are commonplace in offices, enterprise-wide computer networks, intranets and the Internet. The network 116 (see FIG. 1) may include and/or be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods (including the methods 400 and 500 illustrated in FIGS. 9 and 11, respectively) described above. Such instructions may be stored on one or more non-transitory computer-readable media.

In some embodiments, the system memory 22 stores computer executable instructions that when executed by one or more processors cause the one or more processors to generate the screens and interfaces (e.g., the screens 412A and 412B and the interfaces 200, 202, and 220) described above. Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A mobile device comprising:
    a touch display;
    a transceiver;
    a processor connected to the touch display and the transceiver; and
    a memory connected to the processor, the memory comprising instructions that are executable by the processor, when executed by the processor, the instructions instructing the processor to perform a method comprising:
- replacing a standard keyboard with a shopping keyboard on the touch display, the standard keyboard comprising first keys each representing a letter of an alphabet,
- displaying, on the touch display, a first shopping keyboard comprising second keys representing businesses, wherein the shopping keyboard is a second shopping keyboard;
- receiving, from the touch display, a selection of a particular one of the second keys, the particular second key representing a particular business;
- the shopping keyboard comprising third keys representing purchasable items, each of the purchasable items comprising at least one of a product and a service;
- displaying, on the touch display, the second shopping keyboard in response to receiving the selection of the particular second key, the purchasable items represented by the third keys being available from the particular business;
- receiving, from the touch display, a selection of a particular one of the third keys representing a particular purchasable item; and
- displaying at least one of a sharing option and a purchasing option on the touch display in response to the selection of the particular third key, the sharing option being operable to supply information about the particular purchasable item to a messaging application for communication thereby via the transceiver to a different mobile device, the purchasing option being operable to initiate purchase of the particular purchasable item.

2. The mobile device of claim 1, further comprising receiving a modification to a keyboard setting that enables a shopping application to display the second keyboard.

3. The mobile device of claim 1, wherein the method further comprises:
- displaying, on the touch display, a standard keyboard option;
- receiving, from the touch display, a selection of the standard keyboard option at a time when the touch display is displaying the shopping keyboard; and
- replacing, on the touch display, the shopping keyboard with the standard keyboard after receiving the selection of the standard keyboard option.

4. The mobile device of claim 3, wherein the method further comprises:
- displaying, on the touch display, a shopping keyboard option; and
- receiving, from the touch display, a selection of the shopping keyboard option at a time when the touch display is displaying the standard keyboard, wherein the standard keyboard is replaced with the shopping keyboard after the selection of the shopping keyboard option is received.

5. The mobile device of claim 1, wherein the method further comprises downloading a shopping application by utilizing the mobile device.

6. The mobile device of claim 5, wherein the method further comprises installing the shopping application on the mobile device.

7. The mobile device of claim 1, wherein the method further comprises enabling the shopping keyboard by adding the shopping keyboard to a list of available keyboards.

8. The mobile device of claim 1, wherein the method further comprises executing the messaging application on the mobile device.

9. The mobile device of claim 8, wherein the method further comprises automatically executing a shopping application when the messaging application is executed.

10. The mobile device of claim 1, wherein the method further comprises sharing the information about the particular purchasable item to the different mobile device upon receiving a selection of the sharing option.

11. The mobile device of claim 1, wherein the method further comprises adding the particular purchasable item to a shopping cart upon receiving a selection of the purchasing option.

12. The mobile device of claim 1, wherein the method further comprises facilitating viewing of a detail associated with the particular purchasable item.

13. The mobile device of claim 1, wherein the method further comprises facilitating configuration of the first shopping keyboard, the second shopping keyboard, or a combination thereof.

14. The mobile device of claim 1, wherein the method further comprises providing a website for purchasing the particular purchasable item upon receiving a selection of the purchasing option.

15. The mobile device of claim 1, wherein the method further comprises facilitating transmission of a message via the messaging application.

16. A method for use with first and second mobile devices each comprising a display and executing a messaging application, the first mobile device being operable to display a standard keyboard with first keys on the display of the first mobile device, each of the first keys representing a letter of an alphabet, the method comprising:
- replacing, by a shopping application executing on the first mobile device, the standard keyboard on the display of the first mobile device with a shopping keyboard, wherein the shopping application is configured to display a first shopping keyboard comprising second keys representing businesses, wherein the shopping keyboard is a second shopping keyboard, the shopping keyboard comprising third keys representing purchasable items, each of the purchasable items comprising at least one of a product and a service;
- receiving, by the shopping application, a selection of a particular one of the second keys while the shopping application is displaying the first shopping keyboard, the particular second key representing a particular business;
- displaying, by the shopping application, the second shopping keyboard in response to receiving the selection of the particular second key, the purchasable items represented by the third keys being available from the particular business;
- receiving, by the shopping application, a selection of a particular one of the third keys representing a particular purchasable item; and
- displaying, by the shopping application, at least one of a sharing option and a purchasing option on the display of the first mobile device in response to the selection of the particular third key, the sharing option being operable to supply information about the particular purchasable item to the messaging application for communication thereby to the second mobile device, the purchasing option being operable to initiate purchase of the particular purchasable item.

17. The method of claim 16, further comprising displaying a keyboard setting associated with the second keyboard.

18. The method of claim 16, wherein the shopping application is further configured to display the standard keyboard on the display of the first mobile device, and the method further comprises:
   receiving, by the shopping application, selections of particular ones of the first keys representing a message while the shopping application is displaying the standard keyboard; and
   supplying, by the shopping application, the message to the messaging application for communication thereby to the second mobile device.

19. The method of claim 16, wherein the shopping application is operable to display the standard keyboard on the display of the first mobile device, and the method further comprises:
   displaying, by the shopping application, a standard keyboard option on the display of the first mobile device;
   receiving, by the shopping application, a selection of the standard keyboard option at a time when the first mobile device is displaying the shopping keyboard; and
   replacing, by the shopping application, the shopping keyboard with the standard keyboard after receiving the selection of the standard keyboard option.

20. The method of claim 19, further comprising:
   displaying, by the shopping application, a shopping keyboard option on the display of the first mobile device; and
   receiving, by the shopping application, a selection of the shopping keyboard option at a time when the first mobile device is displaying the standard keyboard, wherein the standard keyboard is replaced with the shopping keyboard after the selection of the shopping keyboard option is received.

21. The method of claim 19, further comprising:
   after the shopping application has replaced the shopping keyboard with the standard keyboard, receiving, by the first mobile device, selections of the first keys representing a message; and
   supplying, by the shopping application, the message to the messaging application, which shares the message with the second mobile device.

* * * * *